United States Patent
Lumsden et al.

(10) Patent No.: US 11,089,157 B1
(45) Date of Patent: Aug. 10, 2021

(54) AGENT SPEECH COACHING MANAGEMENT USING SPEECH ANALYTICS

(71) Applicant: Noble Systems Corporation, Atlanta, GA (US)

(72) Inventors: Mary Tabitha Lumsden, Snellville, GA (US); Jonathan W. West, Manchester City, VT (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 46 days.

(21) Appl. No.: 16/277,431

(22) Filed: Feb. 15, 2019

(51) Int. Cl.
*H04M 3/51* (2006.01)
*G10L 15/18* (2013.01)
*G06F 40/56* (2020.01)
*G10L 15/26* (2006.01)
*G09B 19/04* (2006.01)

(52) U.S. Cl.
CPC .......... *H04M 3/5175* (2013.01); *G06F 40/56* (2020.01); *G10L 15/1815* (2013.01); *G10L 15/26* (2013.01); *G09B 19/04* (2013.01)

(58) Field of Classification Search
CPC .. H04M 3/5175; G06F 40/56; G10L 15/1815; G10L 15/26; G09B 19/04
See application file for complete search history.

(56) References Cited

U.S. PATENT DOCUMENTS

| | | |
|---|---|---|
| 7,231,351 B1 | 6/2007 | Griggs |
| 7,640,161 B2 | 12/2009 | Morris et al. |
| 7,650,282 B1 | 1/2010 | Morris |
| 7,904,296 B2 | 3/2011 | Morris |
| 8,051,086 B2 | 11/2011 | Jeffs et al. |
| 8,411,841 B2 | 4/2013 | Edwards et al. |
| 9,001,976 B2 | 4/2015 | Arrowood et al. |
| 9,112,974 B1 | 8/2015 | Wilsie et al. |

(Continued)

FOREIGN PATENT DOCUMENTS

WO   WO2015/131125   9/2015

OTHER PUBLICATIONS

Using Nexidia Interaction Analytics 11.3, Nexidia, Inc., Apr. 25, 2016, 394 pages.

*Primary Examiner* — Michelle M Koeth
(74) *Attorney, Agent, or Firm* — Blank Rome, LLP

(57) ABSTRACT

Agents are coached to improve their performance by participation in a speech coaching campaign. In one embodiment, an administrator identifies top and bottom performing agents, and retrieves their voice call recordings that are processed by a speech analytics system to produce word clouds corresponding to desirable and undesirable phrases. After reviewing and potentially editing the word clouds, a set of desirable and undesirable operational phrases are created, which the agent should use, or not use, during a call. A speech analytics system is configured to detect the presence of these operational phrases for an agent when the agent is on a call. The agent may review information depicting how well they are utilizing the desirable phrases and avoiding the undesirable phrases, and points may be allocated reflecting the agent's usage. The points may be processed by a gamification system to incentivize the agent to improve their performance.

16 Claims, 16 Drawing Sheets

(56) References Cited

U.S. PATENT DOCUMENTS

| | | | |
|---|---|---|---|
| 9,160,853 B1 | 10/2015 | Daddi et al. | |
| 9,386,153 B1 | 7/2016 | Koster et al. | |
| 9,674,358 B1 | 6/2017 | Daddi et al. | |
| 9,781,266 B1 | 10/2017 | Koster | |
| 9,787,838 B1 | 10/2017 | Lembersky et al. | |
| 9,848,082 B1 | 12/2017 | Lillard et al. | |
| 9,936,066 B1* | 4/2018 | Mammen | G10L 15/26 |
| 9,942,392 B1 | 4/2018 | Ouimette et al. | |
| 10,237,405 B1 | 3/2019 | Neuer, III et al. | |
| 2011/0044447 A1* | 2/2011 | Morris | H04M 3/51 |
| | | | 379/265.03 |
| 2014/0356822 A1* | 12/2014 | Hoque | G09B 7/00 |
| | | | 434/185 |
| 2015/0195406 A1* | 7/2015 | Dwyer | G06F 21/6254 |
| | | | 379/265.07 |
| 2018/0332165 A1* | 11/2018 | Cunningham | H04M 3/2236 |
| 2019/0050875 A1* | 2/2019 | McCord | G10L 25/63 |

* cited by examiner

Agent Speech Coaching Management

Create Word Clouds / Select Phrases / Configure ASC Campaign / Review Results 506 — ASC Campaign ID: 507 — New Agent Cust. Svc-Jan 2019  [Edit]

Select Agent(s) Used to Generate Word Clouds

| Available Agents |
|---|
| Sam Appleton |
| Betty Boop |
| Kevin Kranman |
| Jane Doe |
| Frank Eastman |
| ALL of ABOVE |

512

⇧ Select
⇩ Remove

| Selected Agents |
|---|
| Kevin Kranman |
| Sam Appleton |
| Jane Doe |

516

Performance Type

[X] Top Performers    [ ] Bottom Performers

Select KPI(s)

[X] Number of Sales/Hr    [ ] Conversion Rate
[ ] Survey Satisfaction    [ ] Dollars Collected
[ ] Avg Handle Time         [ ] Dollars Donated

Select Call Campaign Parameters

Call Campaign ID: Widget Sales    Start Date: January 1, 2019    Stop Date: February 1, 2019    [Search]

FIG. 5

Agent Speech Coaching Management

/ Create Word Clouds / Select Phrases / Configure ASC Campaign / Review Results /

702 — ASC Campaign ID: New Agent Cust. Svc-Jan 2019   [Edit]

Select Agents to Coach — 710

Available Agents (711):
Sam Appleton
Betty Boop
Kevin Kranman
Jane Doe
Frank Eastman
Chris Haggerty 712 — Select
714 — Remove Selected Agents (716):
Betty Boop — 718

Select Call Campaign — 720

Campaign ID: Cust. Svc. — 722  Start Date: March 1, 2019 — 724   Stop Date: April 15, 2019 — 726

Word Clouds/Operational Phrases to Apply — 730

[X] Desirable Phrases — 734   [X] Undesirable Phrases — 736

Reports

Real Time Reports to: — 740
[ ] Supervisor   [X] Agent — 742   [X] Team Lead — 746   [X] Leaderboard — 744

Select ASC Incentivization Format to Use: — 750

[ ] Self-Dual   [ ] Dual with Others   [X] Contest — 752
[ ] Net Score   [ ] Most Improved

**Current Leading Agents
—Speech Coaching for Customer Service**

| Name | Points |
|---|---|
| 1. Betty Boop | 455 |
| 2. Jim Smith | 400 |
| 3. Jane Doe | 233 |
| 4. Frank Eastman | 221 |

Time Remaining for Today's Contest: 3 hours, 24 minutes

FIG. 10

AGENT SPEECH COACHING MANAGEMENT USING SPEECH ANALYTICS

BACKGROUND

One of the largest expenses that a contact center operator has is associated with the cost of employing agents. Agents are the most important resource in the contact center, and also the most expensive. The turnover of agents is relatively high in a contact center environment. Consequently most operators have a need to effectively and efficiently train agents to perform at a high level. Agents that are performing well typically have greater satisfaction in their job and are more valuable to the contact center operator, and hence these agents are rewarded faster via pay increases. Thus, contact center operators and agents are interested in methods for quickly and effectively training agents to perform better.

Various mechanisms which have been developed to train agents to perform better. Some training methods are structured to ensure that the agent is familiar with the technology; i.e., the agent can quickly handle, transfer, and hold calls. Similarly, the agent is trained to effectively search information and access various computerized systems that may be necessary to address a customer's issue. Other training is structured to ensure that the agent is familiar with the rules and policies of a calling campaign. However, once the agent has a working knowledge of the mechanics of how handle the technology and familiarity with the rules and practices of a calling campaign, they are frequently unguided as to how to increase their performance level. Frequently, agents that excel in their performance exhibit another level of customer interaction that has been difficult to quantity and even more difficult to teach less qualified agents. This involves quantifying and teaching how a top performing agent interacts with callers on a personal basis, i.e., via their conversation.

One approach for dealing with agent performance involves coaching the agent. In this approach, a mentor (typically a senior, more experienced agent) provides critique of how the agent is handling a call. The coaching may be real-time, while the call is being handled. In this approach, the coach may be able to listen on the call and provide advice which only the agent can hear. This can be done in-person or via a specialized conference bridge. Or, the coaching may be non-real-time, where call recordings are discussed after the call with the agent and the coach. This approach, while it may be effective, has several drawbacks. First, this involves the time of the coach, and hence the coaching session increases the cost to the call center operator. Second, the coach is limited typically to coaching one agent at a time, and hence providing coaching to a plurality of agents is difficult and time consuming. Either multiple coaches are required, which increases the cost, or agents are only sporadically coached. Finally, the coaching process may be hit-or-miss, based on the experience and skills of the coach and the particular call being analyzed. This approach does not necessarily scale-up well, nor can it be easily replicated by simply hiring more coaches. Typically, the coach is experienced in the particular context in which the agent is handling calls. For example, the coach may be familiar with practices that are effective in the particular context, such as debt collection or customer service context. Hiring a person familiar with one type of calling campaign does not necessarily mean that coach would be effective in another.

Therefore, what is needed is a better method of coaching agents, which can be easily scaled and replicated. While the method relies upon the expertise of a coach which is familiar with the context and effective practices, the execution of the coaching process should rely on technology instead of one-on-one human interaction, so that it can be quickly scaled and replicated, and provided to all agents on an as-needed basis.

BRIEF SUMMARY

Technologies are generally presented herein that manage the provision of agent speech coaching, which pertains to coaching an agent's speech for how the agent handles calls. The technology involves using speech recognition to monitor the speech used by an agent, and to provide, if necessary, real-time feedback to the agent as to whether their speech is aligned with certain policy goals. This is accomplished by utilizing various speech technologies to monitor and ascertain speech patterns of effective agents, to facilitate identifying what operational words/phrases are effective. These operational phrases are then configured in a speech analytics system so that the performance of an agent can be monitored to provide either trending or real-time feedback as to how well their speech adheres to certain desired practices or uses the effective words/phrases. The agent may be incentivized in one embodiment to modify their speech practices by use of a graphical user interface providing relative progress and performance information.

In other embodiments, a similar approach can be utilized to identify phrases used by poorly performing agents, and to identify what those phrases are. Then, agents can be similarly monitored to provide trending or real-time feedback as to how well their speech avoid certain undesirable phrases.

The subject matter disclosed herein may be implemented as a computer-controlled apparatus, a computer process, a computing system, or as an article of manufacture such as a computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIGS. 4A-4B show one embodiment of word clouds that may be used to identify desirable and undesirable operational phrases.

FIG. 5 illustrates one embodiment of graphical user interface for managing the creation of word clouds in conjunction with the concepts and technologies disclosed herein.

FIG. 7 illustrates one embodiment of graphical user interface for configuring a coaching session for an agent in conjunction with the concepts and technologies disclosed herein.

FIG. 10 shows one embodiment of a graphical user interface displayed on a leaderboard for providing additional motivational aspects to an agent in conjunction with the concepts and technologies disclosed herein.

DETAILED DESCRIPTION

Figure 1:
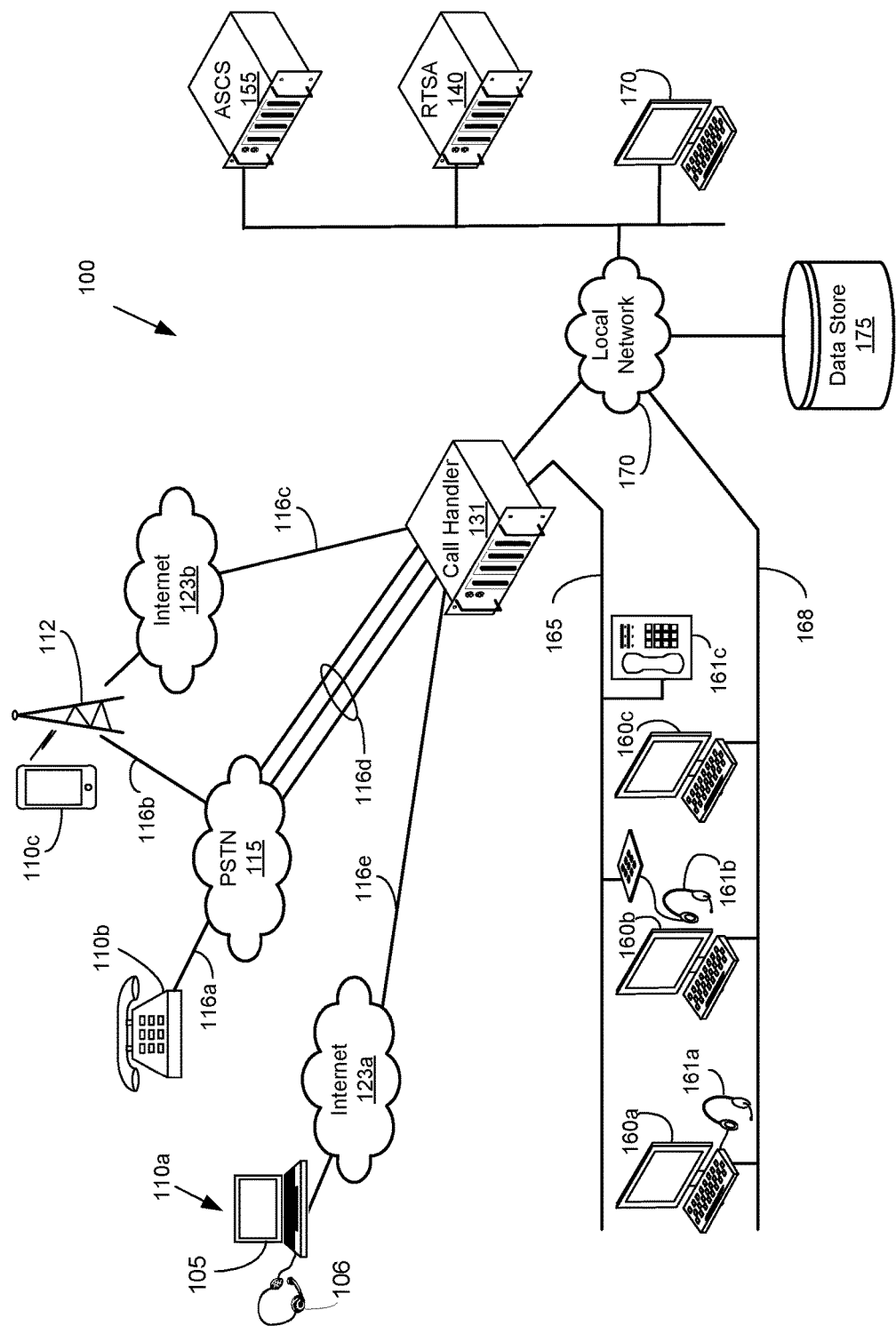
FIG. 1 shows one embodiment of a contact center in which the concepts and technologies herein may be applied to provide management of the speech coaching of an agent.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout. Embodiments of the invention may be utilized in various industries, as will become apparent to those of ordinary skill in the art as they read the disclosure. However, for purposes of this disclosure, applications involving contact centers are mainly used for illustrating various embodiments of the invention.

Exemplary Contact Center Architecture

FIG. 1 shows one embodiment of a contact center architecture 100 illustrating the various technologies disclosed herein. The contact center shown in FIG. 1 may process voice calls that are inbound-only, outbound-only, or a combination of both (sometimes referred to as a "blended" contact center). Thus, in some instances, the contact center may be referred to as a call center when referring primarily to the context of handling calls. Although many aspects of contact center operation are disclosed in the context of voice calls, in various embodiments, the contact center may process other forms of communication such as, for example, facsimiles, emails, text messages, video calls, and chat messages.

Since the contact center may handle calls originating from a calling party, or initiated to a called party, the term "party" or "remote party" without any further qualification, refers to a person associated with a call processed by the contact center, where the call is either received from or placed to the party. The term "caller," if used, will generally refer to a party communicating with the contact center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology. Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a headset 106. The computing device 105 may in turn be connected to an Internet 123a. Those skilled in the art will recognize that a variety of protocols and facilities may be used to convey voice calls.

In various embodiments, inbound calls from callers to the contact center may be received at communications handler, and more specifically a call handler 131, which is a computer-based processing system configured to process voice calls, such as SIP (session initiated protocol), VoIP (voice over Internet Protocol), or TDM (time division multiplexing) technology based voice calls. The call handler could be, e.g., an automatic call distributor ("ACD"). In particular embodiments, the call handler 131 may be a specialized switch for receiving and routing inbound calls under various conditions. The call handler 131 may route an incoming call over contact center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the call handler 131.

In various embodiments, calls may be routed over facilities 165 to an agent for servicing. That is, for example, the party may speak with an agent to receive customer service. An agent typically uses a computing device 160a-160c, such as a personal computer, and a voice device 161a-161c. The combination of computing device 160a-160c and voice device 161a-161c may be referred to as a "workstation." In many instances, the computing device handles VoIP so that reference to the "computer workstation" or the "agent's computer" refers to the computer processing device of the workstation, but which may be closely integrated with handling voice as well. Thus, for these particular embodiments, the workstation can be assumed to have at least a data capability and may have a voice capability. Depending on the embodiment, the interaction between the call handler 131 and the agent workstation computers 160a-160c, as well as other components, may involve using a local area network ("LAN") 170.

In addition to receiving inbound communications, including, for example, voice calls, emails, text messages, and facsimiles, the contact center may also originate communications to a called party, referred to herein as "outbound" communications. In some embodiments, the call handler 131 may comprise a dialer, such as a predictive dialer, to originate outbound calls at a rate designed to meet various criteria. In various embodiments, the call handler 131 is typically configured to dial a list of telephone numbers to initiate outbound calls. Data for the calls may be stored in a data store 175.

Finally, the contact center architecture 100 may include incorporate a real-time speech analytics system 140. This is configured to receive, in some embodiments, two distinct voice streams for a call, so that the speech from the agent is readily distinguished from that of the remote party. The call handler 131 typically will establish a call leg to the RTSA 140, so that the RTSA may "listen" in to the call. Upon detecting certain indicated words or phrases, the RTSA may generate a message, frequently called an event notification message, to a particular component, such as the agent speech coaching system 155.

The agent speech coaching system ("ASCS") may receive a process the event notification messages from the RTSA, and react accordingly. In other embodiments, the ASCS functionality may be incorporated into the call handler, so that the event notification messages are sent from the RTSA to the call handler. In either case, the ASCS processes the event notification messages to appropriately coach the agent as it is configured. Details of how the coaching process operates is described below.

An administrator using the administrator workstation 170 may interact with the ASCS to configure the process, and to define various parameters associated with a coaching campaign for an agent. As discussed below, the administrator will gather the necessary data to conduct a coaching campaign, configure the components to conduct the coaching campaign, and review the results of the coaching campaign for the agents, or a plurality of agents. As shown in FIG. 1, the ASCS 155, the RTSA 140, the administrator's computer 170, may communicate via the LAN 170 to each other, as well as for communicating to the call handler 131 and the agent's workstation 160.

Although a number of the above entities may be referred to as a "component," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located/integrated with) other components. Furthermore, one or more of the components may be implemented on a single processing device to perform the functions described herein. In addition, the contact center architecture 100 may be provided as a hosted solution, where the call processing functionality is provided as a communication service (a so-called "communication-as-a-service" or "CaaS") to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in art will recognize FIG. 1 represents one possible configuration of a contact center architecture 100, and variations are possible with respect to the protocols, facilities, components, technologies, and equipment used.

Service Overview

The management of agent coaching as disclosed herein uses speech analytics to apply technology in a scalable manner that is intended to help poorly performing agents to emulate top performing or effective agents. This is accomplished in one embodiment by using the RTSA system 140 to ascertain the speech patterns used by top performing agents and then applying that technology to motivate poorly performing agents to conform their speech patterns to be similar to those of effective agents. Essentially, to a degree, poor performing agents are coached to mimic speech patterns of the top performing agents.

Heretofore, this has been difficult, because while top performing agents could be readily identified via various performance metrics, it was not always clear why the good agents were good, and how to improve the performance of poor agents. Past practices of using an individual to coach a poor performing agent relied on ad-hoc teaching practices. Or, past practices relied on the poor performing agent "shadowing" (i.e., watching and listening) to an effective agent and hope that by osmosis, the poor performing agent will somehow "pick up" the effective practices of the top performing agent. Obviously, such approaches are not scalable nor easily duplicated because it involved one-on-one agent coaching and the results were dependent on the skills of the coach, who could not be replicated.

Hence, speech recognition and other technologies are now applied to ascertain why good agents are top performers. This involves identifying which speech patterns are to emulated, which are to be avoided, and then monitoring the speech of poor agents and providing real-time, or near-real-time feedback. In this approach, it is easier and more effective to scale up to coach agents of preferred speech patterns, and apply feedback to agents to adjust their speech practices in furtherance to certain defined goals.

Figure 2:
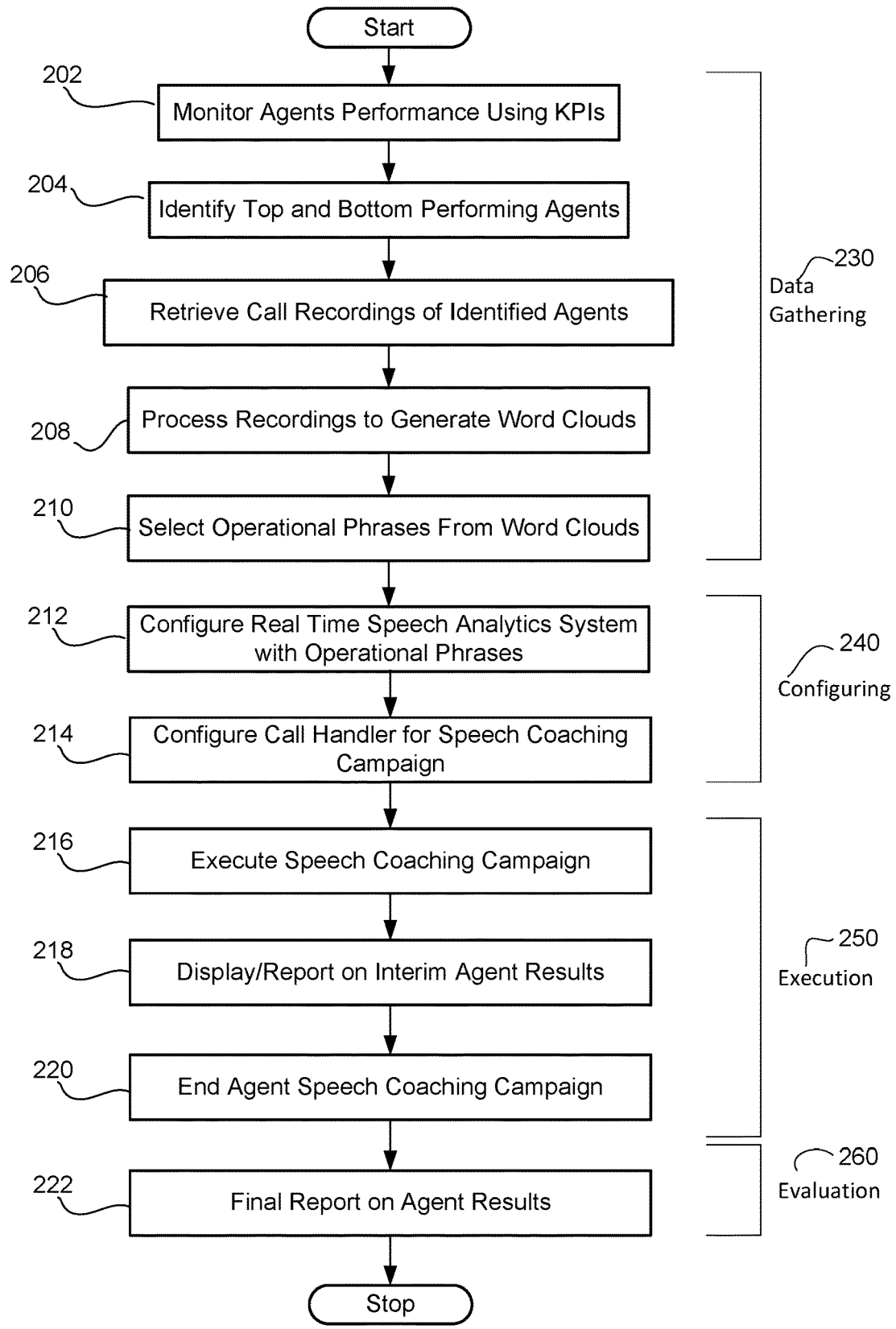
FIG. 2 shows one embodiment of a high level process flow of various operations associated with managing the coaching of an agent's speech.

A high level overview of the process involved is shown in FIG. 2. The process can be divided into several distinct phases. The first phase is the data gathering phase 230, which involves collecting information used to evaluate the agent being coached. This information can be collected and generated any time prior to the subsequent steps. The data gathering phase may be carried out once and applied to a number of coached agents, hence it is scalable in concept. The next phase is the configuring phase 240, which occurs just prior to executing a coaching campaign for an agent. This involves providing the appropriate information to the various components that are necessary to execute the coaching campaign.

Next comes the execution phase 250, which executes the coaching campaign for the identified agents. The term "coaching campaign" is used herein to refer to the coordinated effort among the components to process the information as described herein for the purpose of influencing the speech of a contact center agent in handling a voice call. It is distinct from a conventional calling campaign. The coaching campaign involves calls, but for the purpose of analyzing and comparing data to provide the agent with coaching information. The meaning of the term "campaign" by itself, as used herein, should be evident from the context as referring either to a call campaign or a coaching campaign, and it should recognized that these are distinct concepts.

Finally, the last phase is the evaluation or reporting phase 260. This allows review of the completed information and allows evaluation of the extent to which the agent's speech has been modified. It is possible that reporting information may be made available during the execution phase, but only when the execution phase is completed can the final evaluation phase start. The evaluation of information during the execution phase is also possible, but typically the final evaluation begins only after the execution phase completes its specified duration. It is possible to cut short the evaluation time period, and conduct the evaluation phase early, though.

Data Gathering Phase

The data gathering phase 230 begins with various preliminary steps, detailed in operations 202-206. First, the contact center must monitor agents to ascertain which agents in their workforce are their good or top performing agents in operation 202. This involves defining and using various key performance indicators ("KPIs") that serve as metrics to measure the agents' performance. The use of KPIs in a contact center context is well known and may reflect various criteria. For example, in a contact center handling sales, the metric may be dollars of sales per hour ($ sales/hour). In other contact centers involving in selling a product or service, agents may be measured on a conversation rate—a rate in which a caller was 'converted' or sold a product/service. This metric may be useful when the price of the goods being sold varies widely. In some contexts for example, an agent who is able to sell every other caller on a $10 item is considered a better agent than one who is able to only sell every $20^{th}$ caller a $100 item. Obviously, in a sales environment, the metric may be measured in various ways, such as dollar or products sold within a time frame or on a per-call basis.

In other contexts, the KPIs are adjusted as appropriate. For example, in a contact center handling customer complaints, there may not be an opportunity to sell an item, and hence using a metric involving sales/hour is inapplicable. In this case, the KPI may reflect how quickly or how effectively the agent is able to address the issue. In this context, the KPI may be an average call handle time ("ACH time") or time to resolve the issue. This reflects how quickly the agent addressed the caller's issue. On the other hand, because agents may be incentivized to provide a quick, but not necessarily correct answer, another metric is called "first call resolution." This reflects the rate at which callers have their issue resolved on the first call. If the agent provided incorrect or useless information on the initial call, the caller may call back into the call center complaining about the same problem. Hence the agent did not resolve the problem on the first call. Thus, first call resolution reflects on the effectiveness of the information the agent provided on the first call.

The range of KPIs used in a contact center depends on the context of the calls. However, for a given context, the scope of various KPIs to measure performance are well known. Some KPIs pertain to the overall aggregate performance of the call center (such as calls in queue). However, other KPIs can be applied to a specific agent, and reflect the agent's performance. Some common KPIs include: sales per agent, revenue per successful call, average handle time, cost per call, customer satisfaction, after call work time, on hold time, call resolution rate, average sales per agent, and agent utilization. In particular industries, such as debt collection, KPIs may be defined that are unique to the debt collection context, such as "dollars collected" or "promises to pay" that were measure as a rate of the call volume. Other applications, such as customer service applications in a telecommunications/media provider, may have other agent-specific KPIs, such as customer retention rates. It is not reasonable to expect that all forms of agent performance related metrics can be listed in this document as they may be defined unique for the calling campaign. However, it will be clear to those skilled in the art what constitutes a metric in a particular contact center that is used to measure the agent's performance. Quite often, these metrics are presented in reports and reviewed by management in evaluating the agent's performance or the overall performance of the contact center.

Regardless of what metric is used to measure an agent's performance, the action in operation 202 collects data that allows identifying the top and bottom performing agents in operation 204. The identification of the top agents is for the purpose of identifying those agents whose speech patterns are to be emulated. The identification of the bottom performing agents is for the purpose of identifying those agents whose speech patterns are to be avoided. The bottom performing agents may also be targeted for speech coaching. Of course, this does not preclude targeting the top performing agents for further improvement or improvement in another area. Frequently, agents that are considered top performers in one category are not necessarily the top performers in another category. Hence, these top performing agents may be identified for improvement in another category.

The identification of top (or bottom level) performers may use one or more KPIs. Depending on how the contact center defines the performance criteria, a top performer may be one measured strictly by using one KPI, such as sales per hour. However, other contexts may be more nuanced, and may use two or more KPIs. As noted, not all contact centers involve sales efforts, and hence the sales per hour KPI may be inapplicable. Other contact centers may measure an agent's effectiveness, e.g., via a post-call survey or via a measurement of first-call-resolution. Other contact centers may define a combination of KPIs, and define an algorithm for their application. For example, customer satisfaction may be one metric, but this may be balanced by average call handle time. Thus, 50% may be weighted using the customer satisfaction score and 50% weighted by average call handle time. Other KPIs may be taken into account, such as call hold time. It is also possible that an administrator would know a priori, which agents are considered top performers. Typically, though this is based on reviewing some report based on processing metrics.

Further, the identification of the top agents may involve identification of a single top agent, or a plurality of top agents. Hence, it becomes apparent that top (or bottom) performing agent could be singular or a group of agents. This could involve, e.g., the top five agents, the top 5% of agents, etc. The purpose of steps 202-204 is to define those agents that the call center operator has determined to be effective performers, and whose speech is to be emulated by others.

The purpose of identifying the bottom performing agents is to identify those agents whose speech is not to be emulated, i.e., it is to be avoided. It provides the other end of the spectrum and can be used to coach the agent of what speech is not to be used. Thus, in one embodiment, an agent to be coached will have exposure of speech patterns to emulate and speech patterns to avoid. This dichotomy of speech patterns may better aid in coaching the agent in modifying their speech.

In operation 206, call recordings of the identified agents are retrieved. The call recordings are analyzed using speech analytics and the purpose at this step is to prepare the speech analytics system to glean the speech patterns of the top performing agents and that of the bottom performing agents. In many embodiments, obtaining a sample of the call recordings of a group may be more effective for illustrating best speech practices.

The retrieval of the call recordings is over a defined time period. The call recordings may involve a number of days, either selected in sequence, or sampled over a time frame. Further, the call recordings typically pertain to the same purpose (i.e., calling campaign) as the type of calls that the coached agent is involved in. Thus, it would not make sense to retrieve calls of top performing agents in a political donation solicitation campaign, when the agent to be coached is involved in a customer service calling campaign. Recall that a call campaign is distinct from a coaching campaign, and the former refers to calls handled by an agent having a particular context or purpose. Thus, a political donation solicitation context is not the same as a customer service context, which is different from a debt collection context. Typically, agents are trained to use particular systems, technologies, and policies for handling a particular calling campaign. Stated another way, the technologies and concepts presented herein are used to improve the performance of an agent in a given context by emulating the speech patterns of top performing agents working in that same given context.

The above actions can be done prior to configuration and execution of the agent speech coaching campaign in phases 240 and 250. The identification of agents and their associated recordings may be done once, and serve as the benchmark for coaching agents. It is possible to retain and use the associated recordings even though many of those top performing agents are no longer employed by the contact center operator. Such benchmark recordings could be obtained periodically, e.g., annually. This would take into account potential changes in language styles that are more effective. If the recordings are effective in demonstrating an emulated speech style, then there may not be a need to replace or augment the recordings for quite a while. Frequently, however, changes in the campaign or successful techniques may dictate obtaining an updated set of recordings. For example, if the original campaign was a presidential political solicitation call, and the current campaign is now a campaign for donating to animal welfare, then it may be appropriate to identify the top performing agents for the animal welfare campaign, and obtain those recordings as the standard to emulate for a similar animal welfare calling campaign. In other embodiments, updated recordings may not be required.

The recordings are segregated into two groups—those associated with top performing agents, and those associated with bottom performing agents. In some instances, it may be only necessary to obtain one group. Once the call recordings are obtained, they are then processed in operation 208 to generate word clouds. This can be done by the speech analytics system which can process the audio only from the agent (distinct from the party) on the calls, and generate a corresponding word cloud. The exact process in which the word clouds are generated may vary. In one embodiment, the speech analytics system generates a transcript of the agent's speech, and then generates a list of the frequency of usage. This is done for the aggregated set of calls.

Figure 4A:
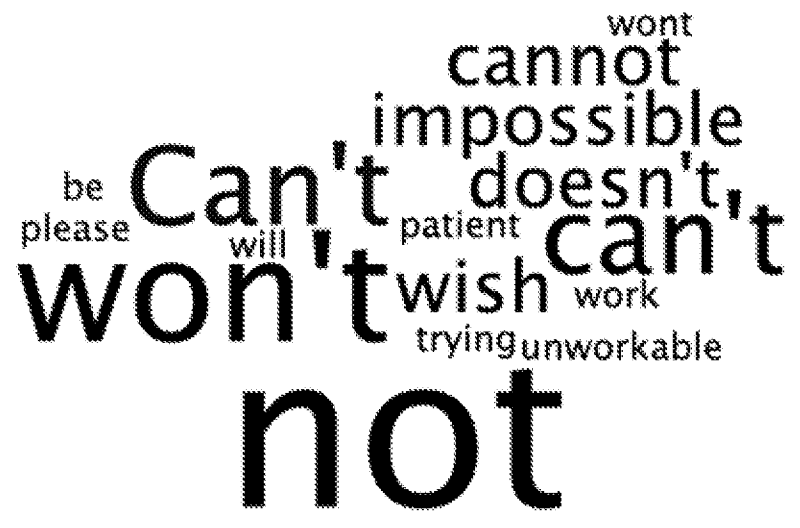
Figure 4B:
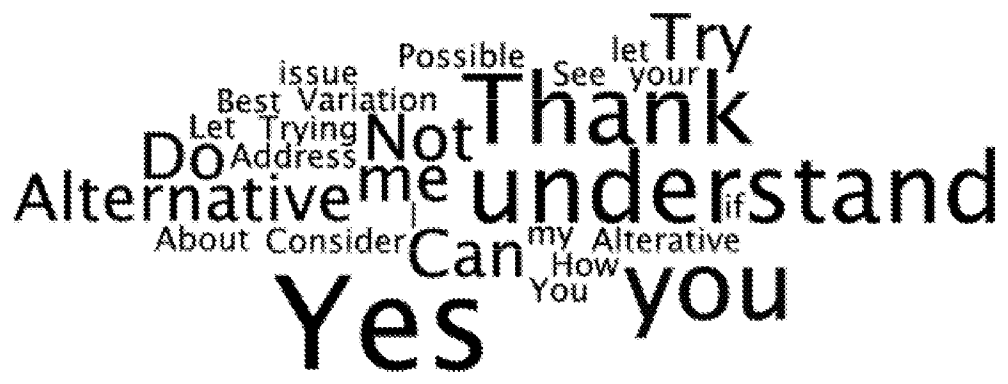

The generation of the word clouds in operation 208 is to facilitate presentation of the information to a human. The word cloud can be also conveyed using a table comprising the word and it frequency usage indication, but while such lists facilitate computer manipulation, humans do not always find a printed list as comprehensible as a word cloud. Conversely, a computer typically do not receive as input a word cloud, and if so, it would likely translate that to a table format to process. Either the speech analytics system or some other application can generate a word cloud, which illustrates the words in a random placement on a diagram, with their frequency of use correlated to their font size. For example, FIGS. 4A-4B illustrate example word clouds where more frequently used words appear larger.

The generation of the word cloud is to facilitate human analysis in the next step. Typically, there are two word clouds generated—the desirable phrases based on the top agent performers, and the undesirable phrases based on the bottom agent performers. Once the word clouds are generated in operation 208, these word clouds are reviewed by a human to select certain phrases, which are referred to as the "operational phrases." In essence, the human reviewing the word cloud can edit the word cloud by removing words therefrom in operation 210. The word or words selected or which remain are referred to herein as "operational phrases," and each may encompass one word or a phrase. They are called operational phrases because these are the phrases that the real-time speech analytics system will operate on. Thus, the initial word cloud produced by the call recordings can be referred to as a "preliminary word cloud," and once edited or the operational phrases selected, the word cloud is called the "operational word cloud." In practice, the context will be clear as to whether the word cloud being referenced is the preliminary or operational word cloud, and hence the qualifier may not always be included.

In some contexts the preliminary word cloud could be the operational word cloud, i.e., there is no editing of the phrases. However, in many contexts, the preliminary word cloud may have many phrases which can be removed. For example, it is possible that a contact center may provider calling campaigns to sell a life insurance product, and the agent may be stating the name of the particular product frequently on the call. However, the administrator may find that the agent is very good at selling, regardless of whether it is this product or some other financial services product. Thus, the particular name of the financial services product may appear frequently in the word cloud, but may be edited out. The skills that make the agent good at selling are not dependent on the name of the product being sold, but on the other phrases used by the agent. Thus, the preliminary word cloud may be pared down to select the operational phrases.

The operational word cloud reflects the phrases that the coached agent will be evaluated against. Thus, the desirable operational word cloud are phrases that the coached agent is to emulate and the undesirable operational word cloud are phrases that are to be avoided. Editing the preliminary word cloud to form the operational word cloud is frequently desired to make a more manageable and meaningful list of words to manage. The preliminary word cloud typically has phrases that are not that relevant to increasing the performance of an agent. As will become evident, the coached agent must be mindful of these operational phrases, and too large of a list would be overwhelming for the average agent to apply. For example, a word cloud with 100+ phrases would typically be too large for meeting the goals described herein and should be pared down to a more management level. The exact level may vary, but 5-25 words/phrases may be more applicable and effective.

The operations discussed in conjunction with steps 208 and 210 may also be considered part of the data gathering phase, in that they can be done in advance of establishing a coaching session for an agent. The data gathering phase can be done just prior to establishing a coaching session, or months prior. Once the operational word clouds are created, they may be updated manually as well. That is, a specific word/phrase could be added or removed to each word cloud as deemed necessary to update the word clouds. Further, it may be discovered that a particular word cloud is effective for its coaching purpose, and there is no need to update the word cloud.

The Configuration Phase

The configuration phase 240 requires configuring various components with appropriate information so that they can process calls or information in the required manner. The steps 212 and 214 can be performed in either order, or simultaneously. Turning to operation 212, these operations involve configuring the real-time speech analytics ("RTSA") system. This could be the same or different speech analytics system that processed the call recordings. When processing the call recordings, real-time operation is not necessary, but it may be desired during the execution phase.

The RTSA system receives a call involving the coached agent, and analyzes the speech of the agent. The call handler is configured to establish a call leg involving the agent to the RTSA system. Hence, the RTSA "listens" to each call for the specified calling campaign involving the agent, and is aware of the operational phrases that are to be detected. The RTSA will monitor the agent for specific phrase, as defined by the coaching campaign. Once a specific operational phrase is detected, the RTSA will generate an indication, referred to herein as event notification message, reporting the detection of a particular operational phrase in the speech of a particular agent. The event notification message is received by another system, which processes it according to the concepts and technology disclosed herein. This other system is called herein as the agent speech coaching server ("ASCS"). In this embodiment, it is described as a separate system, but the ASCS could be integrated into the RSTA, or integrated into the call handler. However, for illustrating the concepts herein, it is depicted as a distinct processing system, though that is not always required.

The configuration of the RTSA is accomplished by the ASCS, so the ASCS serves as a command center for configuring the necessary components and performing the necessary functions during execution of the coaching campaigning. Thus, the ASCS will typically also configure the call handler and any other components needed for the coaching session. Because the RTSA listens in on every call in the identified calling campaign, the call handler must be directed to establish a call leg to the RTSA for the agent being coached. This is accomplished in operation 214. Once the ASCS has configured the call handler and the RTSA, then the coaching campaign is ready to begin, i.e., the execution phase can be started. For purposes herein, the coaching campaign is considered to involve a plurality of calls involving that agent. Each call will result in the RTSA monitoring the agent's speech for the operational phrases, which is reported to the ASCS. Information of the operational phrases detected is used by the ASCS to provide agent feedback, which is referred herein as a coaching session. Thus, a particular call involves a particular coaching session, while a series of coaching sessions makes up a coaching campaign. Thus, reference to the "coaching campaign" refers to general aspects involving a series of calls, whereas a particular "coaching session" may encounter specific actions and results specific to that call.

The next phase is the execution phase 250. While there is no requirement that this phase start immediately after the configuration phase, typically the delay is minimal, typically less than a couple of days (if that long). That is, configuring a particular agent for a coaching campaign is in anticipation of starting a coaching campaign for that agent. The execution phase is where calls handled by the agent will have a call leg established to the RTSA, and the ACSC will receive the event notifications from the RTSA for that agent. During the execution phase, cumulative or per-call results may be presented to the agent, their supervisor, and/or to a leaderboard. Other notification or alerts may be generated, as appropriate. The agent may be able to see their interim progress in their speech patterns by displaying agent coaching information on their workstation computer.

Information collected during the execution phase typically pertains to information about the progress of the coaching campaign and this may be sent to external entities. For example, information about the progress of one or more agents, as measured by the detection of operational phrases, may be sent to a gamification system, which may display the information in a format to further motivate the agent's performance. The information processed by the gamification system typically is designed to motivate one or more agents, and is not necessarily optimized to report the agent's progress to management.

Once the execution phase 250 is completed, and sufficient data is obtained, then an evaluation phase 260 is entered, which involves evaluating the data. This may involve generating reports or summarizing the data. In practice, the information generated at this point may be similar in format and content relative to the last instance of reported information generated at the end of the execution phase during the coaching campaign. This information is typically geared for management review, but aspects may be shared with the agent. Similarly, there may be information geared for agent's review, which can be shared with management, but typically management is focused on trends or the direction of an agent's performance. While an agent may be interested in trends of their performance, they may also be motivated upon reviewing information pertaining to a competitive event, such as a contest.

The above process is intended to describe at a high level the overall steps and functions performed to implement a coaching campaign. Although the concepts and technologies may be described in the context of a single agent being coached, it should be evident that the process could be replicated or batched so that several agents may be coached simultaneously. Further, other variations within the process will be discussed in conjunction with further details of the various operations.

System Overview

Figure 3:
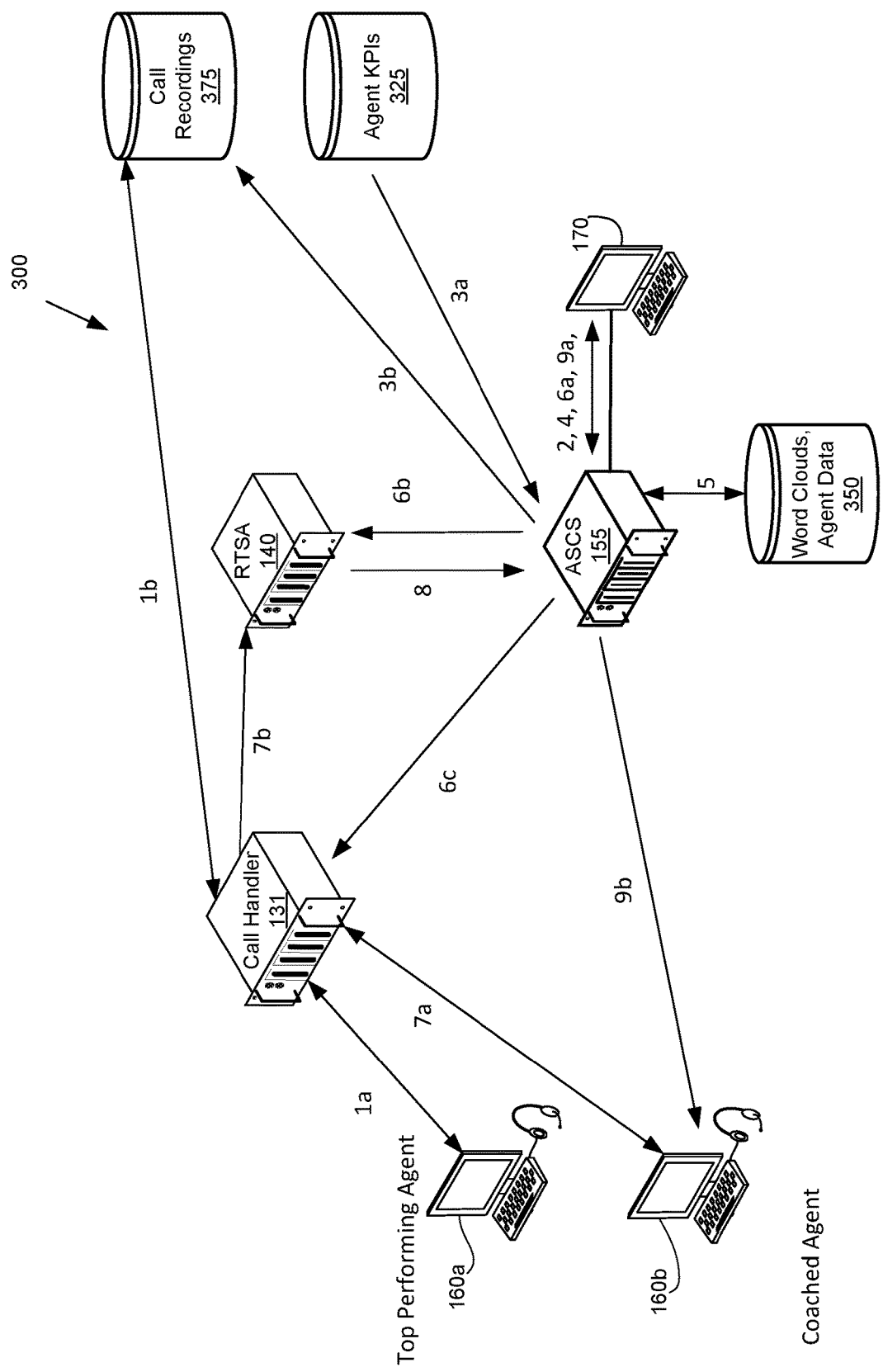
FIG. 3 shows one embodiment of a high level interaction flow among various components associated with managing the coaching of an agent's speech.

An overview of the various system components and how they interact is useful to understand the concepts and technologies described herein. Turning to FIG. 3, this diagram reflects some of the components introduced in FIG. 1, but adds other components to emphasize the operations described in conjunction with FIG. 2. The interactive flows referred to below correspond to the number associated with line. These flows illustrate some of the main interactions at a high level.

Before addressing the sequence of messaging, a brief review of the components is provided in context of the concept disclosed so far. The top performing agent is represented by workstation 160a. The agent to be coached is represented by workstation 160b. Both workstations are able to process calls involving the call handler 131. Note that while these agents may be working simultaneously, the calls recorded by the top performing agent typically occur prior in time to the calls evaluated by the coaching agent. The call handler is also able to establish a call leg with the RTSA system 140, so that the RTSA can "listen" in on agent's speech during the call. Specifically, the RTSA monitors the agent's speech (not the remote party). The call recordings are stored in the call recording datastore 375. Agent KPI information is stored in another datastore 325. In practice, these may be the same storage systems or additional storage systems may be involved.

The ASCS 155 is the controller of the system for purposes of providing the coaching campaign. In addition to configuring the RTSA 140 and call handler 131, it also interacts with an administrator's workstation 170 and with a datastore 350 that stores various information associated with the coaching campaign. Specifically, the datastore 350 stores word clouds and agent's coaching related data.

The process flow begins in this embodiment with the contact center operating as normal, wherein agents 160*a*, 160*b* interact with the call handler 131, which stores call recordings as a matter of practice in the call recordings datastore 375. For purposes of illustration, it can be assumed that as a matter of course, all calls are recorded, and at this time, it is not known whether agents 160*a*, 160*b* or others are the top agent performers or require coaching. Thus, interaction 1a and 1b reflects that calls are being made involving the agents, and call recordings are stored.

At a subsequent time, the administrator 170 logs into the ASCS 155 via interaction 2 for purposes of creating a coaching campaign. At this time, the administrator may retrieve the various agent KPIs in interaction 3a. This allows the administrator to ascertain who are the good agents to emulate, the bad agents to avoid emulating, and which agents need improvement. For sake of illustration, it can be assumed that the administrator has identified agent 160*a* as a top performing agent whose speech is to be emulated, whereas agent 160*b* is the agent needing coaching.

The administrator then retrieves in interaction 3b the call recordings for a specified set of calls associated with agent 160*a*. The ASCS may processes those calls to generate a (preliminary) word cloud reflecting the phrases that are to be emulated—e.g., the desirable phrases word cloud. In other embodiments, the ASCS may direct the RTSA to obtain the recording and process them to generate the word cloud. In another variations, the ASCS may obtain the recordings and provide them to the RTSA, and receive the word clouds. Note that a similar process (not shown) could occur with respect to determining the bad agent, retrieving their call recordings and having the ASCS generate an undesirable phrases preliminary word cloud. Thus, there are various alternative approaches for processing the call recordings to generate the word cloud.

In interaction 4, the administrator will interact with the ASCS to edit the word cloud to produce the set of operational phrases, thereby producing the operational word cloud. This may result in smaller, more manageable list of words. Or, the administrator could manually add selected words. Once the operational word cloud is produced, the ASCS then stores the word clouds in the datastore 350. At this point, the data gather phase is complete.

The next phase, the configuration phase, involves configuring the components. The administrator via interaction 6a directs the ASCS to configure the RTSA in interaction 6b to detect the set of operational phrases previously determined. Other information is provided, such as identifying the agent to be coached, i.e., which agent the operational word cloud is to be applied. The ASCS also configures the call handler 131 in interaction 6c, so that calls involving the coached agent (agent 160*b*) results in a call leg established to the RTSA 140.

The next phase, the execution phase, involves execution of a coaching session. The session would begin with the agent having a call established between the coaching agent 160*b* and the call handler 131 via interaction 7a. This could be an inbound or outbound call relative to the call center. Because the agent is to be coached, a call leg is also established via interaction 7b to the RTSA 140. The RTSA will then monitor the agent's speech for detection of any of the operational phrases. It will report via interaction 8 any such detection to the ASCS 155, including identifying the agent involved. The interactions are referred to herein as event notification messages.

The ASCS 155 will maintain a tally of results for that agent, reflecting potentially both real-time data that can be presented to the agent or their supervisor. The information may be group for that call, or as longer-term cumulative trend data, reflecting trends since the coaching campaign began for that agent. This may be communicated to the administrator via interaction 9a and the agent via 9b. This allows the agent, and the administrator, to review the progress the agent has made. The information can be structured to provide trending information, reflecting cumulative changes in behavior of the agent, as well as per-call information, which the agent can use to ensure their speech is modified accordingly for that call.

The steps of 7a-9b may be repeated many times as calls are being handled by the agent being coached. Multiple agents may be coached for a given coaching campaign. At some point, the coaching campaign completes, and the cumulative results can be evaluated to monitor the agent's progress in reaching a performance goal. Frequently, the goal is defined by the same KPIs used to identify the top and bottom performing agents.

Word Clouds

FIGS. 4A and 4B illustrate two preliminary word clouds. FIG. 4A represents a negative word cloud that could be generated from the speech from a poor performing agent, and a cursory examination reflects various words that may be construed as negative in nature, e.g., "not", "can't", "won't", "impossible", etc. These reflect speech patterns that are to be avoided. In generating the word cloud, various filters may be applied, so that frequent nonce words (e.g., "um", "u-huh") may be removed. In other embodiments, these words may be retained if the intent is to discourage agents from using these words. Other words may also be manually removed or added. For example, in customer service calls involving e.g., a manufacturer, the name of the manufacturer's product may be frequently stated, and hence would appear in the word cloud. It may be desirable for such words to be filtered out as being neutral in nature. For example, a customer service call to a computer manufacturer can expect to have the word "computer" uttered by the agent, but this is expected and the presence of this word does not necessarily reflect whether the agent is a top performer or bottom performer by using this word.

FIG. 4B illustrates that a positive or desirable word cloud that could be generated from the speech of a top performing agent. In this case, it is obvious that the phrases include various positive oriented speech patterns. For example, the words "yes", "thank", "you", and "understand" are present at relatively high frequency. The presence of these words could be illustrative of empathy and a positive attitude, which may be why the agent is a top performing agent.

The method used for generating the word cloud may vary, and is well known in the art. The concept of the word cloud is that the frequency of usage is reflected by the size of the font. Various algorithms known to those in the art have been proposed to determine the font size, and other limitations may be defined so as to limit the number of words presented or filtered out in the word cloud. The generation of the word cloud is focused on facilitating human analysis, as computer analysis is facilitated by generating text in tabular form.

As will be seen, word clouds are used because they facilitate the administrator or coach evaluating the words clouds on an ad-hoc or heuristic basis to select which terms are to be emulated in the desirable word cloud and avoided in the undesirable word cloud. It is possible that the human-editing of the preliminary word cloud could be optional. In other embodiments, it is possible that computer-based algorithms could be used to generate the operational word cloud. However, such algorithms are frequently not sufficiently developed so that all human review can be eliminated. Hence, even if an algorithm is used, it may be appropriate to also include manual editing. Thus, it is presumed that human review of the preliminary word cloud is typically necessary to form the operational word cloud. This process for editing the word clouds will be discussed further below.

Agent Speech Coaching System User Interface

The operation of the ASCS administrator user interface is used to illustrate some of the functions and processes that occur in order to embody the concepts and technologies herein. Turning to FIG. 5, one embodiment of a user interface is present that pertains to the data gathering phase, namely how to obtain the required call recordings and generate the word clouds used in evaluating the agent to be coached. The embodiment shown in FIG. 5 is illustrative, and other styles and user interface mechanisms may be used for receiving information from the administrator for practicing the various phases.

FIG. 5 includes a first section 500 that includes various tabs that are used at different phases. The first tab 501 is used to create the word clouds, which involves identifying agents that represent top performers and bottom performers. These preliminary word clouds are then edited to create the operational word clouds. Next, information identifying the name of the agent speech coaching ("ASC") campaign 506 is provided, which in this embodiment is given a descriptive name 507. As implied by the name, the word clouds that are generated will be used in coaching newly hired agents in the customer service calling campaign. It is expected that different word clouds will be generated for different campaigns, or different aspects of a campaign. This example is geared towards generating a word cloud based recording from a top performing agent, but other examples may be geared towards an agent that has a high customer service satisfaction index. It is possible to establish one word cloud in one coaching campaign to modify an agent's speech patterns to have a higher customer satisfaction index while establishing another word cloud in another cloud campaign to modify the same agent's speech to have a higher sales level, both for the same call campaign. Of course, because these would be different coaching campaigns, they would not execute simultaneously for the same agent.

The next section 510 is used to identify the agents whose call recordings will be used to generate the word clouds. There are various ways in which this could happen, and FIG. 5 illustrates only one embodiment. In this embodiments, the entire roster of available agents is shown in menu 512. In some call centers, there may be hundreds of agents working, and they may be working on different campaigns. Some of the agents may not even be trained to work on the customer service campaign, which the coaching campaign is intended to address. The administrator may individually select certain agents using function 514 to copy the name in the selected agent icon 516. The administrator may know that these agents work in customer service, or the administrator may know that these are among the more experienced agents. The list of selected agents 516 may be further filtered to identify the top performing agent in that list. In other embodiments, the top-agent may be selected algorithmically, manually, or some other manner.

The administrator may then indicate whether the identification of agents pertains to identifying top performer agents or bottom performing agents in section 520. As evidenced by the mark 522, the administrator is interested in identifying top performing agents. The criteria by which the top performing agent is to be selected in indicated in section 530. In this example, the checkbox for the criteria number of sales/hour 532 has been checked. Finally, the administrator indicates that the call campaign from which the recordings for the top agent is to be obtained is indicated in section 540. The calls are to be from the Widget Sales campaign 543, and a date range 544, 545 is indicated.

To recap, the administrator is requesting the system identify the top agent performers from among the list of agents identified in selection icon 516, based on the criteria of the selected KPI 532, from calls associated with the campaign indicated in section 540. Most likely, there is only one agent having the top number of sales per hour (assuming there is no tie among two agents), and the corresponding call recordings can be identified.

Alternatively, this step could have simply involved the administrator providing a particular agent's name, their campaign, and dates as the source of the recordings. That would have been sufficient to retrieve a target set of recordings, but this presumes that it is known beforehand what agent is considered the top performer. In other embodiments, a library of known recordings could be stored, and that could be selected as the source of the recordings. In many embodiments, contact center operators generate reports that identify agents having a top KPI performance metric, so it may not be necessary for the ASC System to search for a top performer, as the administrator may already know who that is via other means. However, even if known via other means, there will be a need to identify which recordings of that agent are to be used.

Once information is known, the administrator may invoke a search function 546 which will retrieve the identified recordings, and use those recordings to generate a desirable (or positive), preliminary word cloud. The process may be repeated to identify the bottom agent performers, and once those are selected, a corresponding undesirable (or negative) preliminary word could will be generated as well.

It should be evident that the ASCS will use this information to retrieve the corresponding call recordings of that agent, ingest the recordings, and process them to generate the preliminary word cloud(s). Once the recordings are processed to generate the word clouds, the administrator may be presented with a user interface such as shown in FIG. 6A.

Figure 6A:
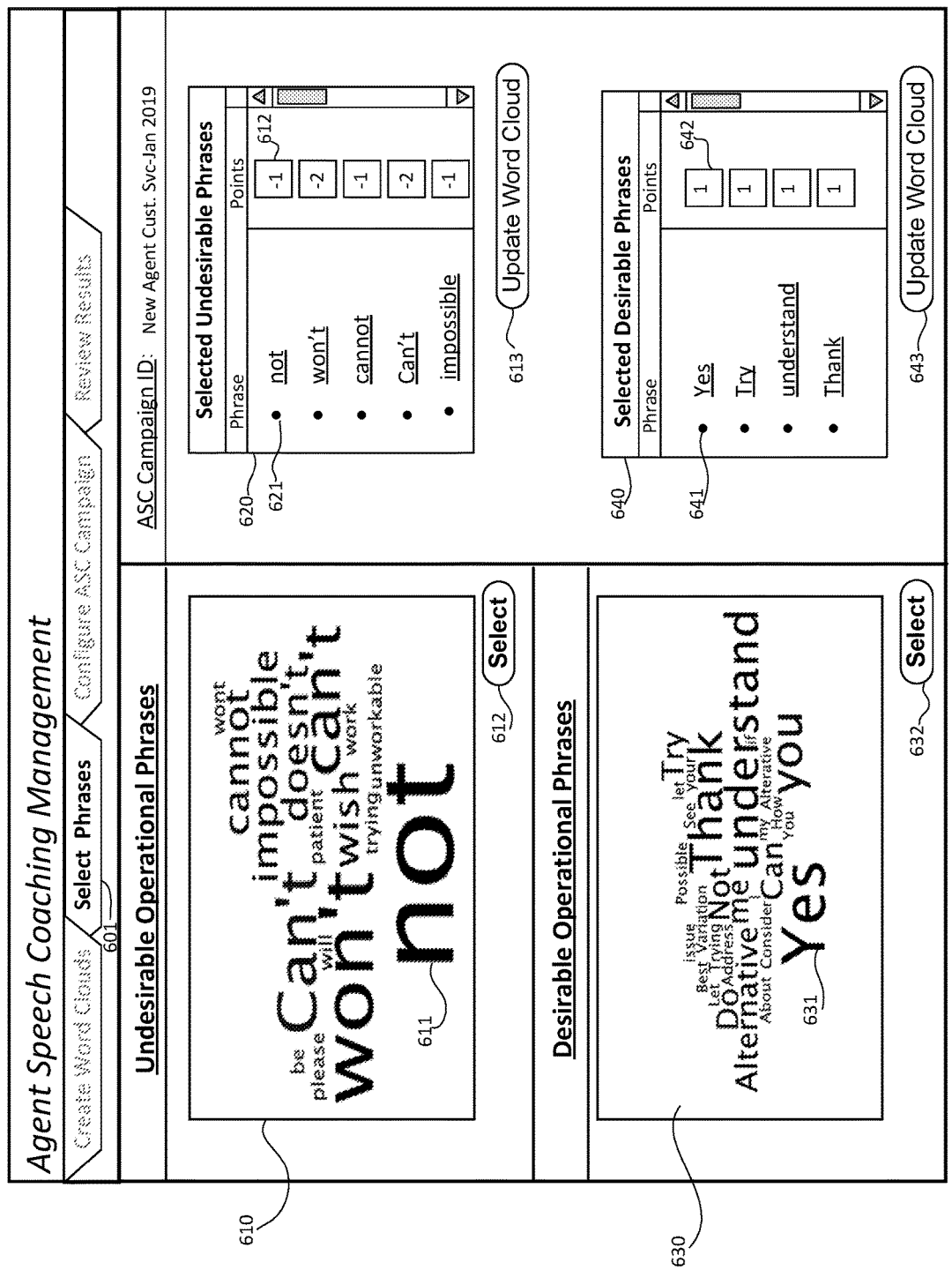
FIGS. 6A-6B illustrate one embodiment of graphical user interface for editing word clouds in conjunction with the concepts and technologies disclosed herein.

Turning to FIG. 6A, this depiction of the user interface is again illustrative. As noted above, there are various other ways in which the target recordings to be used could be indicated. This screen is associated with a separate tab 601, which reflects the selection and editing of the operational phrases. The screen depicts an undesirable preliminary word cloud 610 and a desirable preliminary word cloud 630.

These are the clouds generated by the ASCS after ingesting the call recordings of the top agents and bottom performing agents. Even though the algorithm may apply various filters and controls defining how the word clouds are generated, the administrator may desire to further edit the clouds to define which phrases the system is to operate upon. This is accomplished using various tools 620, 640 allowing the administrator to selectively define which words/phrases should be included (or removed) from the preliminary word clouds.

For example, the undesirable word cloud 610 may have too many words. The administrator may want to select certain words for inclusion in the operational word cloud. Thus, the administrator could use a pointing device to place the cursor over a selected word, such as e.g., the word "not" 611. Then invoking the select function 612, this would cause that word to appear on the selected phrase icon 620, as the word "not" 621. In this manner, the administrator could edit the word cloud by indicating which words are to remain and be shown in the operational word cloud. Although not shown, the administrator could have tools allowing him to delete a word or manually add a word. In other embodiments, the administrator could simply select a previously derived word cloud from a library of word clouds. Thus, the selected phrase icon shows the words "not", "won't", "cannot", "Can't" and "impossible" have been selected. Other words could be added and a scrolling mechanism could allow viewing them. It is recognized that the administrator may apply heuristics in determining which words are more probative for inclusion in a positive word cloud as well as how many words should be indicated.

In addition, the administrator could allocate a point value associated with detection of that phrase. This may be useful for incorporating a gamification or other incentivization system to motivate agents. In this case, a value of −1 612 has been indicated in a corresponding box. This information indicates a relative weighting of the undesirability of that phrase. Compare this to the word "won't" which has a value of −2 assigned to it. Thus, detecting "won't" in the speech of the agent is more undesirable than the detection of the word "not." Once all the words have been selected, the icon 613 can be selected to reflect the changes in the word cloud 610.

Similarly, for the desirable phrases, the agent could select the word "yes" using a pointing device and select the "select" icon 632 causing that word to "yes" 641 to appear on the selected desirable phrases icon 640. In this example, the word "yes" 641 has been given a point value of "1" 642, indicating that its detection is a positive event. Other words have been selected including "Try", "understand", and "Thank", all of which have been allocated a single point each. Once all the words are selected, then the updated word cloud icon 643 can be selected. This will result in editing the word cloud to reflect only the selected phrases, thereby generating the operational word cloud. It is referred to as the operational word cloud as it contains the phrases used in operation.

Figure 6B:
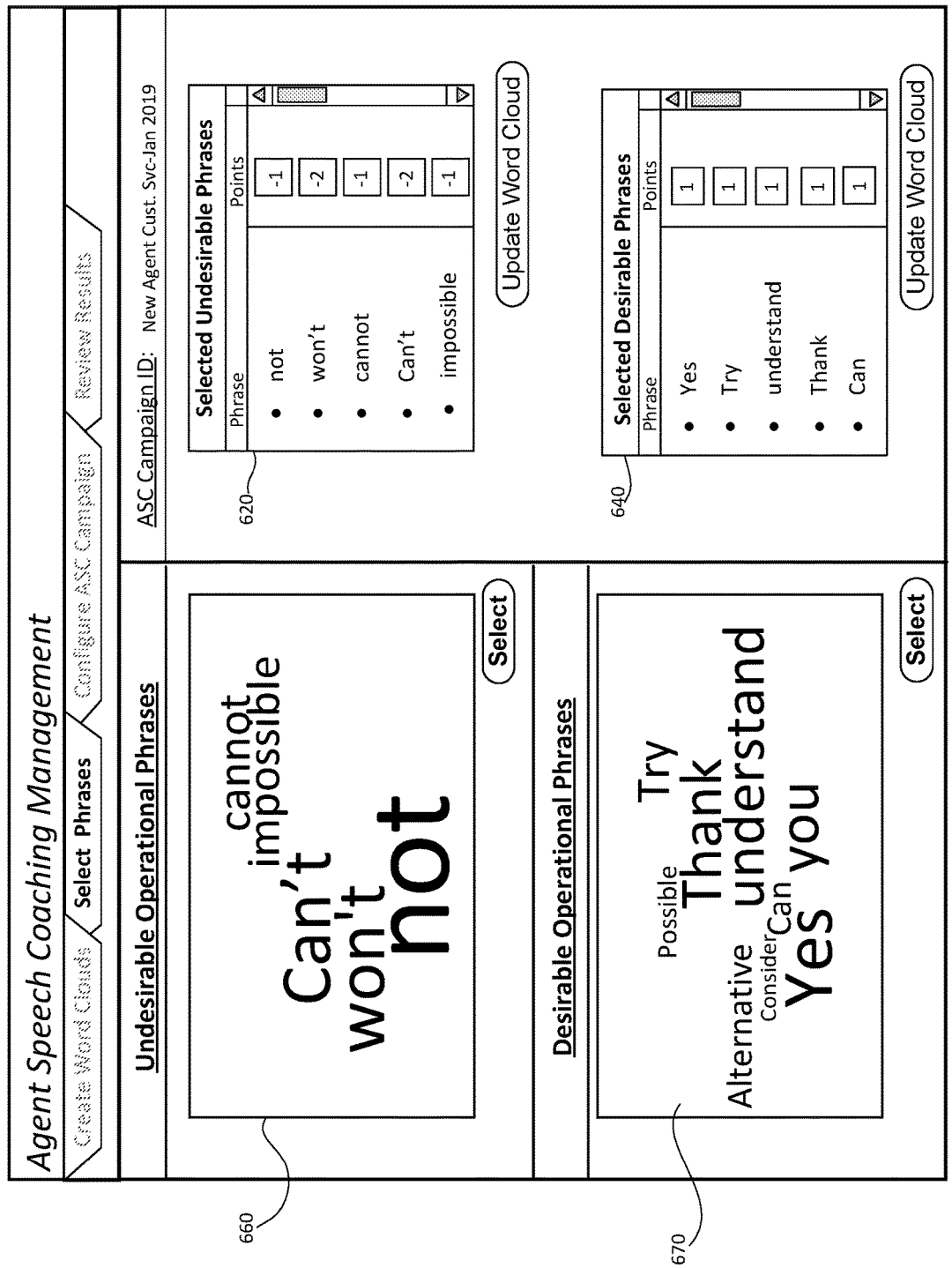

Turning to FIG. 6B, the user interface is shown with the operational word clouds. It is evident that the words in the edited desirable operational word cloud 670 corresponds to the selected words shown in the selected desirable phrase icon 640. Similarly, the words in the edited undesirable word cloud 660 cloud correspond to the selected undesirable words shown in the icon 620. The exact mechanism to edit the word cloud may differ from what is shown. But, it is anticipated that it will be necessary to allow the administrator to edit the preliminary word cloud, by either selecting which words to retain, which words to remove, or even manually adding a word.

In lieu of having the system generating a word cloud, the administrator could manually create a word cloud using a tool in the ASCS. The administrator could type in a list of words, their relative frequency, and the system could generated and use that as the set of operational phrases. However, allowing the ASCS to find and process the phrases of top performing agents allows a more rigorous and repeatable approach to defining word clouds.

At this point, the data gathering phase is complete. The ASCS has a set of operational phrases which are to be detected in a yet-to-be specified agent's speech. Each of the operational phrases is known as to whether it represents a desirable or undesirable phrase. In addition, as will be seen, the optional point system allows the ASCS to tally a cumulative point total that can be used for motivational purposes in a gamification style format. The ASCS also maintains information to indicate whether the agent is, on the whole, modifying their speech in an appropriate and desirable manner by favoring the desirable phrases and avoiding the undesirable phrases.

Configuring the ASC Campaign

Once the preliminary data gathering phase is completed, the next phase is to configure the components. This involves the ASCS providing appropriate information to the RTSA and call handler, as discussed earlier. A user interface for providing this functionality is shown in FIG. 7. Turning to FIG. 7, this functionality is associated with a unique tab 701 for configuring a particular agent speech coaching campaign. In this step the agent to be coached will be identified, and this involves defining what calls are to be monitored, what word clouds will be used, and how information is to be reported.

The agent speech coaching campaign identifier 702 indicates which set of previously determined word clouds are to be used. In this case, this coaching campaign would apply the word clouds previously created. If this value is incorrect, then the administrator can edit the name to reflect the correct coaching campaign identifier. Next, the administrator selects the agent that is to be coached. Typically, but not necessarily, the agent to be coached is not the same as the agent used to generate the desirable word cloud. It may be that the top (or bottom) performing agent is no longer employed, but their recordings were retained for coaching purposes. Further, the agent to be coached frequently is not a top performing agent. However, the agent to be coached could be one of the bottom performing agents. In this example, the administrator access a portion of the user interface 710 dedicated to identifying the agent to be coached. In this embodiment, a list of available agents 711 is used to select the agent to be coached using controls 712, 714, to place their name in the selected agent list 716. In this embodiment, Betty Boop 718 has been identified for coaching.

Merely identifying the agent is not sufficient, since the agent may be working on various campaigns. Thus, the administrator accesses another section 720 for identifying the particular call campaign which the coaching campaign is to be applied. The administrator will enter a name of the campaign 722, and a start date 724 and a stop date 726. This identifies which specific calls should be analyzed. Although this example is based on real-time analysis of the agent's speech and the calls to be analyzed have not yet occurred, the principles of the present technologies could be applied to existing call recordings, e.g., post-call analysis. However, providing real-time feedback to the agent is generally seen as more effective in modifying agent behavior as opposed to providing feedback for previously made calls.

The next section 730 permits the administrator to indicate which type of word clouds should be used for detecting operational phases. In this example, both desirable phrases 734 and undesirable phrased 736 are checked. In monitoring the speech of an agent, it is possible to only monitor the agent for use of desirable phrases. This has the effect of rewarding positive behavior. It is also possible to monitor speech of an agent only for undesirable phrases. This has the effect of discouraging negative behavior. And finally, it is evident that it is possible to do both. The circumstances in which it is appropriate to use any one of the three possibilities varies. For example, an agent may have a tendency to say certain phrases which are to be discouraged (i.e., the agent says "um", "like", or some other nonce word). In such cases, the behavior modification is primary to discourage use of specific phrases. In this case, it may be appropriate to only monitor the agent's speech using an undesirable word cloud. On the other hand, an agent may be encouraged to use more positive phrases, which may justify monitoring the agent's speech using the desirable word cloud. Still, it may be desirable to alter the phrases used by an agent to change certain phrases to another phrase. This may warrant discouraging use of certain phrases and encouraging use of others.

The next section 740 allows the administrator to define who will receive various types of reporting/feedback information. This information may be provided to the agent 742, their team leader 746 or supervisor, or to group, such being displayed via a leaderboard 744. Other forms of notification may be provided, such as type of information provided to the agent. As will be seen, the agent may be provided with various icons indicative of the results of their progress. In various embodiments, subsets of different types of information may be directed to various destinations.

Finally, the next section 750 defines an ASC Incentivization Format ("IF") to use. This may also be referred to as a gamification format. The IF describes various possible graphical user interfaces and procedures associated with processing the points associated with the desirable and undesirable operational phrases that are detected. The points can be used as input to feedback to the agent, allowing the agent to track their progress in modifying their behavior. These formats may follow a gamification type of theme, allowing the agent to compete against other agents or against themselves using the points accumulated. This serves to motivate the agent to modify their speech in furtherance of meeting a goal.

For example, in one format, the points accumulated by an agent could be displayed to the agent as a running total. This could be displayed and compared with the running total tally of another agent in the same calling campaign, creating a duel between two contestants. Alternatively, the highest running list of agents within a group could be displayed, effectively creating a group contest or a race. This option 752 is the one shown as selected in FIG. 7. Other awards or notifications could be presented to an agent who has improve the most, relatively speaking, in a given amount of time. Or, perks or awards could be given to an agent for achieving certain point levels. This has the effect of encouraging or incentivizing the agent to modify their behavior as guided by the word clouds selected. It becomes evident that a wide variety of user interfaces and rules could be created to encourage competition and advancement by a coached agent.

The reporting of the coached agent's progress is important to both the agent and their supervisors. Agents are likely to further modify their behavior in response to positive feedback, and managers know that an agent modifying their behavior as directed means a more productive agent. Consequently, tracking and evaluating the progress is important to ensuring the operational phrases and formats are effective in their purpose.

Figure 8A:
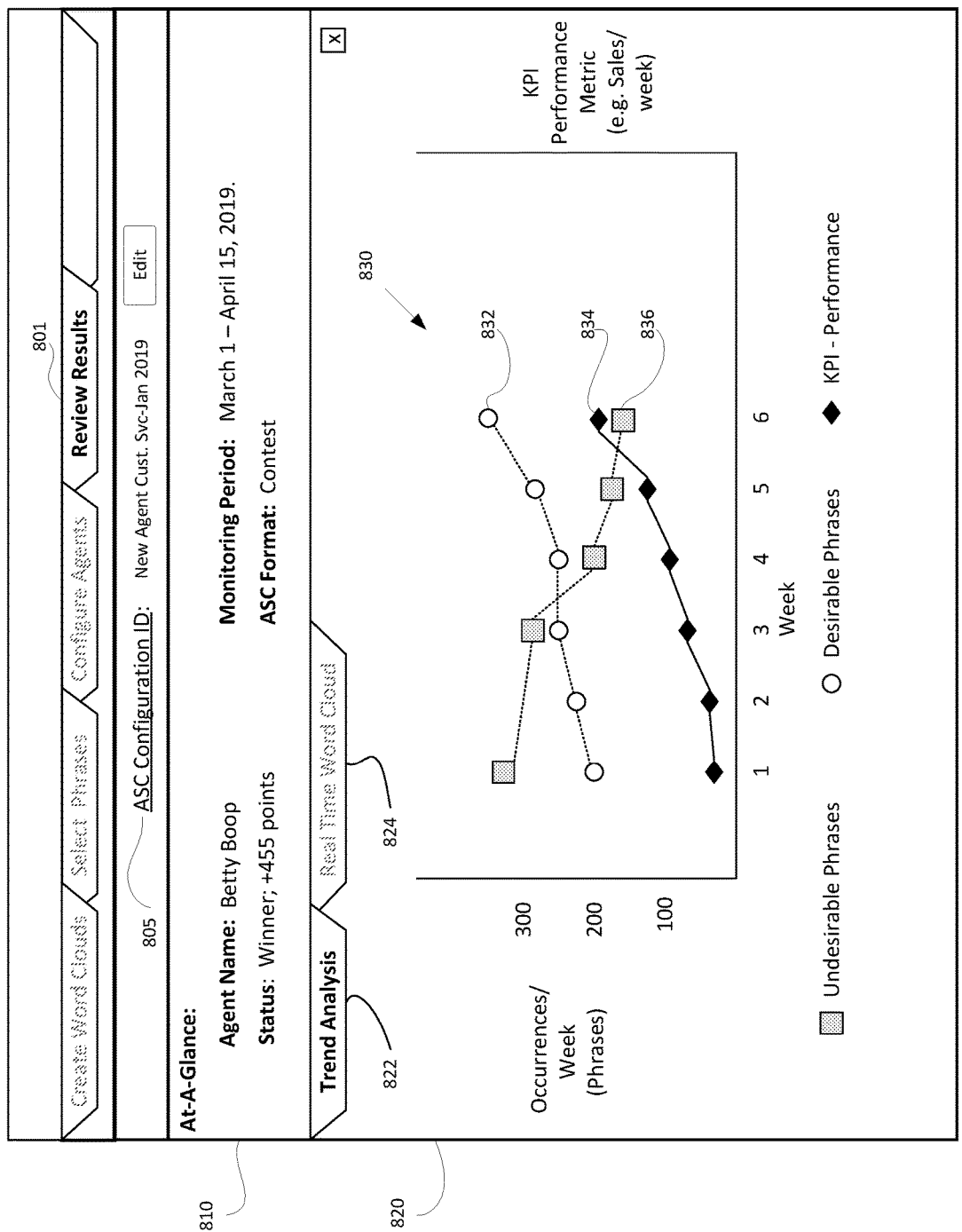
FIGS. 8A, 8B, and 8C illustrate various embodiments of a graphical user interface for providing feedback of an agent's speech performance in conjunction with the concepts and technologies disclosed herein.

One reporting format is shown in FIG. 8A. This type of screen image is intended to be presented to the administrator, but as will be seen, it could be presented to the agent as well. Thus, the screen image depicts the same functional tabs at the top of the image, and selecting the Review Results tab 801 results in displaying either interim or final results. In this configuration, which is merely exemplary, the first section 805 provides information about which coaching campaign is involved. The next section 810 comprises information to provide further context. It identifies the agent, the monitoring period, the ASC incentivization format used, and the status. In this case, the format was a contest and the agent (Betty Boop) is the winner, having accumulated 455 points.

More useful is the information shown in section 820, which may be graphical in nature. One tab 822 can be selected, as shown here, to present trend analysis, over the time period comprising six weeks in this example. This is a form of cumulative analysis over the monitoring period. The other tab 824, can be used to provide a real-time per call word cloud status.

The trend analysis shown comprises a graph 830 indicating three separate data sets 832, 834, and 836. One data set 832 pertains to the frequency of detecting the desirable phrases identified in the desirable word cloud. The frequency is reported in the number of occurrences detected on a weekly basis, in this embodiment. Thus, agent has started with approximately 200 instances per week of stating desirable phrases, and increased to over 300 instances per week at the end of the monitoring period. Similarly, a second data set 834 pertains to undesirable phrases that were detected, and this shows a decreasing trend from over 300 instances per week to approximately 150 per week. The metric on the left vertical access (i.e., occurrence/week) applies to these two data sets. Thus, the agent has demonstrated a change in their speech patterns that reflects using the desirable phrases and reducing the undesirable phrases. This suggests that the agent has been modifying their behavior by substituting phrases. This change is consistent with the goal of management. Although shown as weekly totals, other metrics could be used.

The third data set 836 reflects a performance metric. This may be the same performance metric that management elected to track for this agent. In one embodiment, it is the same performance metric(s) used when selecting the representative top agents used to construct the desirable word cloud. By tracking this performance metric over the monitoring period, a trend analysis can be derived. In this example, the performance metric uses the right vertical access as the metric. If the metric were e.g., sales/week, then this would be reflected as such. Assuming that the metric is sales/week, then in this example, it is evident that the agent's performance has steadily increased over the monitoring period. This suggests that the speech coaching of the agent (whereby the agent uses the desirable phrases, while avoiding the undesirable phrases) has a positive correlation with the KPI metric, and suggests a cause for the observed improved performance effect. This indicates that the speech coaching of the agent has proven desirable in its goal—increasing the agents performance is correlated with modifying the agent's speech patterns.

The administrator may execute simultaneous coaching campaigns with different groups of agents, using slightly different edited word clouds. This allows the administrator to experiment to find out which versions of the word clouds may be more effective. The editing of the preliminary word clouds to obtain the operational word clouds is a heuristic activity, and likely the administrator will require some experimentation and skill developed over time to develop a sense of what word clouds are effective in coaching and how many words are appropriate. Executing two simultaneous coaching campaigns with different edited word clouds, along with reviewing the relative improvement in KPI performance for different coached agents can suggest which word cloud is more effective.

This embodiment illustrates application of both a desirable word cloud and an undesirable word cloud. Other embodiments may apply only one word cloud, such as the desirable phrases, for the purpose of encouraging agent use of certain phrases. For example, in various contexts, agents are required to provide certain disclaimers or other compliance information to the remote party. The goal of management in this case could be to ensure the agent states the required phrase, not that the agent necessarily does not use some other phrase. On the other hand, an agent may be coached to avoid using various phrases such as "like", "um", and "you know." In one embodiment, the agent is discouraged to use certain phrases, and not necessarily encouraged to use a particular phrase. Thus, depending on the need, agents may be motivated to use certain phrases, avoid certain phrases, or substitute certain phrases. The trend analysis shown in FIG. 8A would be modified according to reflect which word clouds were applied.

Agent Feedback

There is a distinction in the purpose of providing coaching campaign results information to the administrator/manager/supervisor versus to the agent. Management uses the results information to track an agent's progress and evaluate the effectiveness of the coaching campaign. A main purpose of providing results information to the agent is to encourage and motivate the agent to modify their speech as directed by management. Simply providing information to an agent of what they should do is frequently not as effective as providing feedback (both real-time and otherwise) to motivate and encourage the agent to change their behavior. Thus, while the feedback of the agent may be designed to convey some of the same information as provided to the administrator, the agent, the information provided to the agent is designed to motivate the agent. In contrast, there is no need to motivate the manager to change their behavior, because it is the agent, not the manager, whose behavior is being changed. The manager is more interested in trend analysis and outcomes. In some cases, for example, the manager may be creating different operational word clouds to test which is more effective. That one agent's performance using one of the word clouds did not improve may suggest that the word cloud is not effective, and may not reflect the agent's inability to improve their performance.

Figure 8B:
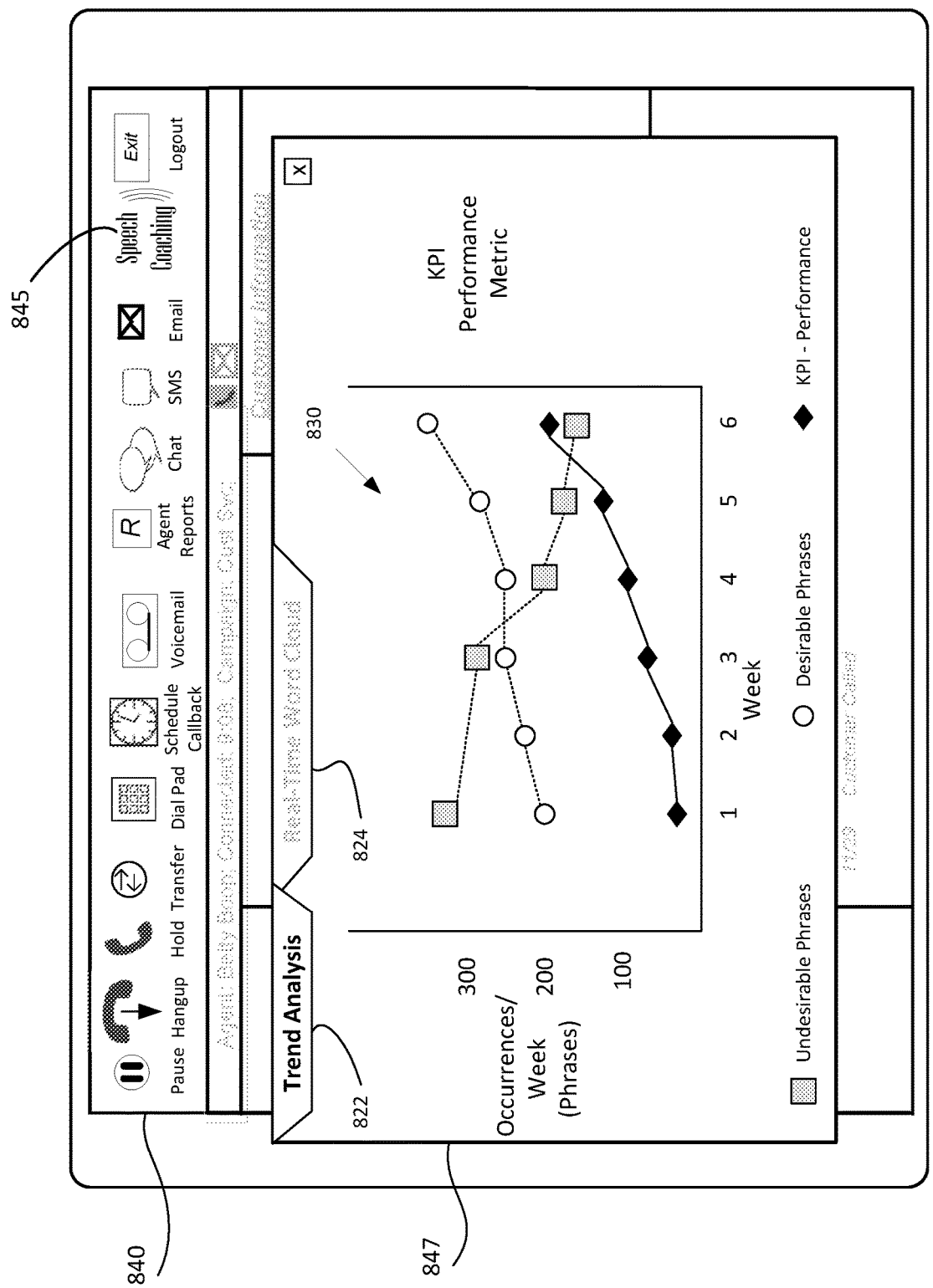

In one embodiment, the agent can view the same trend analysis that the administrator can see, as shown in FIG. 8B. FIG. 8B depicts one embodiment of an agent's screen that comprises a first section 840 that has a series of icons that allows the agent to invoke various functions. One of the widgets 845 is for allowing the agent to review the speech coaching results. Upon selecting this speech coaching widget 845, the agent is presented with a pop-up window 847, which includes the same tabs 822, 824 and the same graph 830. This allows the agent to see their cumulative performance. In various embodiments, the agent can view their cumulative performance from the beginning of the speech coaching campaign to the current date.

Figure 8C:
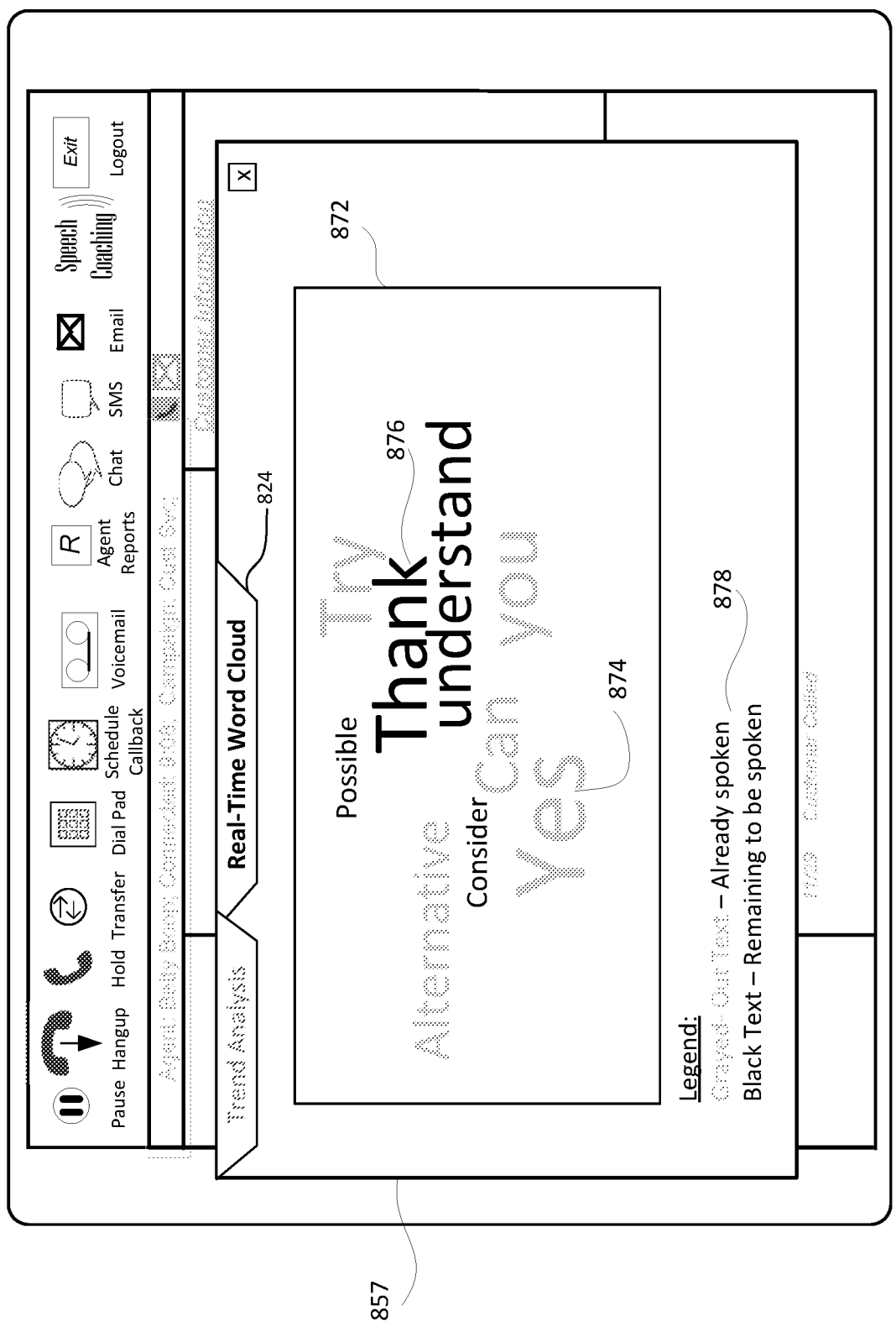

The tab for selecting the real-time word cloud 824 can also be selected by the agent. Although the administrator can view this as well, this is primarily designed to aid the agent on a per-call basis. Turning to FIG. 8C, the agent's screen reflects selection of the Real-Time Word Cloud tab 824. After selection, the pop-up window 857 is presented that shows a word cloud 872. In this embodiment, it shows the desirable word cloud. This word cloud is updated in real-time on a per-call basis as words are detected. In this embodiment, at the beginning of the call, all words would be presented in black text. As indicated by the legend 878, text presented in black means that the word has not yet been detected, thus it remains for the agent to use that word. Once the word is spoken, and the RTSA reports detection via sending an event notification message to the ASCS, then the ASCS will gray-out the corresponding operational phrase. Thus, in this example, the agent has spoken the word "yes" 874, which is represented in grayed-out text. However, the word "Thank" 876 has not yet been detected, and it remains for the agent to speak that word. In other embodiments, the word itself could disappear from the word cloud reflecting it has been spoken instead of having some visual characteristic modified. In this approach, words that are not spoken are visually visible or emphasized, whereas after they have been spoken and detected, their visual presence is diminished by graying out, removing the text, or by some other means. Various modifications of the visual characteristics can be used to emphasize or distinguish which words were spoken.

This type of real-type word cloud is an effective tool to remind agents which words they should use during a call, assuming the opportunity presents itself, to the party. By visually emphasizing words that have not been spoken, a readily discernable visual tool allows the agent to quickly ascertain which words they have not yet spoken. This could be referred to as a "subtractive word cloud" in that words are removed or de-emphasized as they are detected. It is also possible to have an additive word cloud where words are emphasized as they are detected. This is called an additive word cloud. In an additive word cloud, detected words are visually emphasized. Either scheme can be used in conjunction with desirable word clouds or undesirable word clouds. However, some combinations may be preferred. For example, if the agent is to be discouraged from using certain words, the undesirable word cloud presented may have all words grayed out, and therefore the undesirable phrases are de-emphasized. Once an undesirable word is spoken, that word could be visually emphasized on the word cloud. Thus, the use of an undesirable word cloud may be presented to the agent in an additive manner.

The agent may be presented with both types of word clouds, or only one type. Frequently, the desirable word cloud may be presented to the agent as a reminder of certain operational phrases that are to be stated during the call or during calls. Although the embodiments herein illustrate the concept with a single word, a phrase can be illustrated as well. In other embodiment, the phrase itself may be lengthy, and a descriptive phrase may be used in its place. For example, in debt collection calls there is frequently a requirement for the agent to provide a "mini-Miranda" statement, which informs the caller that anything they say can be used by the debt collector in collecting the debt. Rather than include the entire phrase, a portion of the phrase may be presented on the word cloud, or a label such as "mini-Miranda" could be used to represent that phrase. Thus, the entire phrase does not necessarily have to be displayed on the word cloud.

The real-time word cloud is updated by the ASCS in real-time in response to processing the event notifications from the RTSA. This provides a visual tool to further coach the agent to alter their speech in the manner desired. Each call would start with an unmodified word cloud, and it would be modified during each call in response to each operational word phrase detected. It would be possible to further store the final result of the word cloud at the end of each call, so that further coaching of the agent could occur by reviewing the final, stored images of the word cloud. In addition, statistics for each word cloud could be generated and stored for the agent, for each word cloud. These could be on a per call basis, hourly basis, weekly basis, etc. For example, if the agent is expected to use each and every word on the desirable word cloud, statistics could reflect how many words (as a percentage or absolute number) were used on each call. These statistics could be presented or used to generate the trend analysis graphs shown to the agent or administrator. It should become evident to one skilled in the art that in light of the concepts and technologies disclosed herein, that many variations of how and what information is presented to the agent is possible.

It is commonly recognized that agent behavior can be further motivated by utilizing competitive gamification principles. That is, the points allocated to the agent for using each operational phrase can be applied in various gamification type formats to further motivate the agent to perform better during the speech coaching campaign. These are described by the aforementioned incentivization formats. The application of such incentivization formats is optional, as this functionality represents another means to provide further motivation to the agent, above and beyond what was identified. Such incentivization formats are frequently premised on: 1) the agent competing with one or more other agents to ascertain who has advanced to their goal faster, or 2) public recognition of the agent's progress as a form of peer recognition of their progress.

Architectural Considerations

Figure 9:
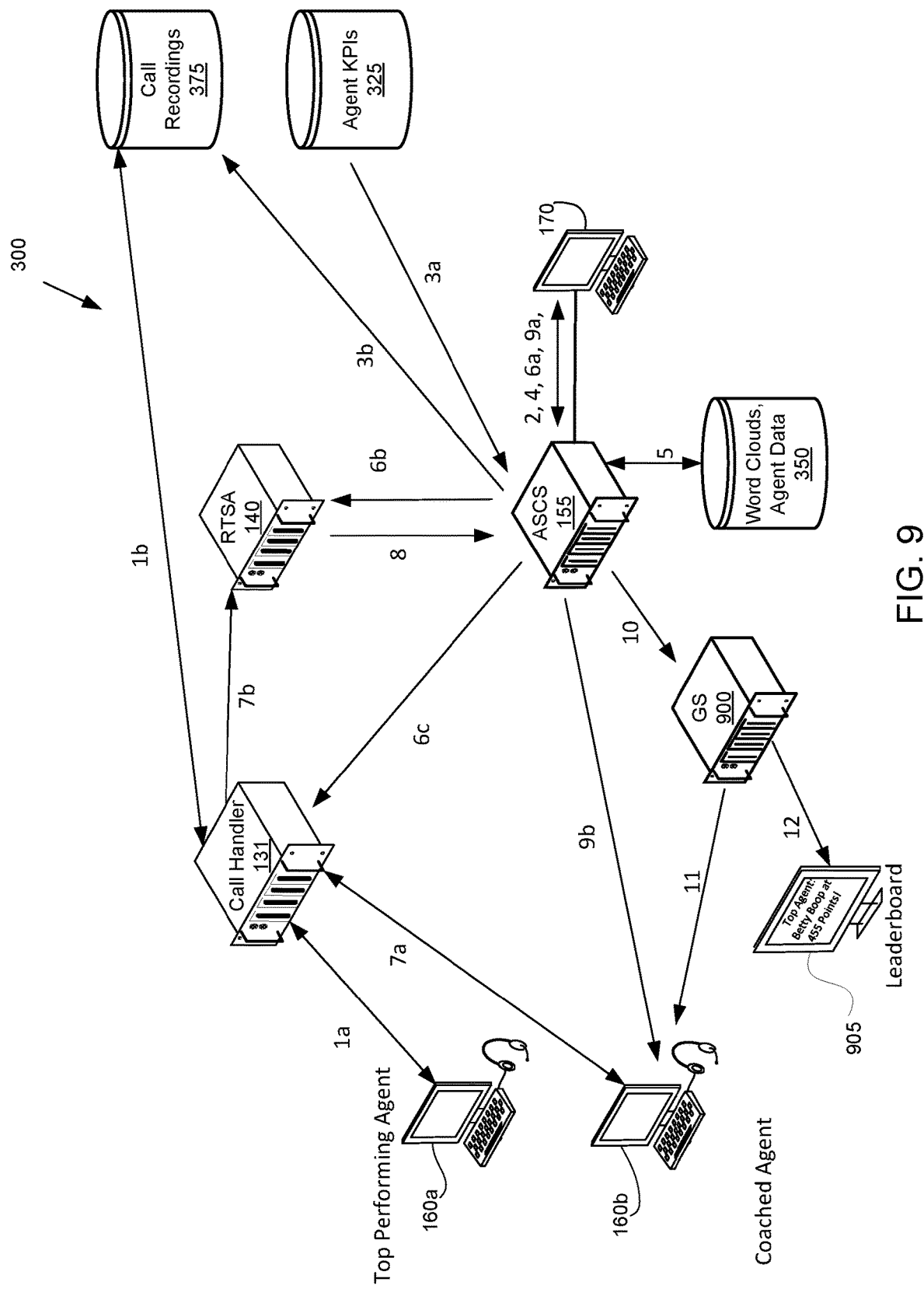
FIG. 9 shows another embodiment of an interaction among various contact center components for providing additional motivational aspects to an agent in conjunction with the concepts and technologies disclosed herein.

One embodiment of the augmentation of the above concepts and technologies to incorporate competitive gamification principles is illustrated in FIG. 9. This is based on the architecture previously discussed, but with the addition of a gamification server ("GS") 900 and a leaderboard 905. The gamification server provides the various processing of the points and the generation of the user interfaces, and formats for competitive interactions of the coached agents. The leaderboard is typically a display device (e.g., flat panel display) that is positioned in a call center so that the agents can readily see the contents and is controlled by the GS. The leaderboard is frequently used to convey call center statistics, general messages, and the like. It can be used to display agent the results (ongoing and finalized) of agents participating in agent speech coaching competitive games.

The process as described via interactions 1-9 are largely the same. The modification involves the addition of interaction 10, between the ASCS 155 and the GS 900. For every event notification message received by the ASCS, the ASCS will provide corresponding point information to the GS 900. Specifically, the ASCS will determine whether the GS should notified, and if so, it will send an event notification message identifying the coaching campaign, the agent, and the points allocated to the event. The GS 900 does not necessarily have to know what specific operational phrase was reported, but does need to know the corresponding points and which agent they are associated with. The GS can receive such indications associated with a variety of agents and manage teams, competitions, contest, and duels between the agents being coached.

In turn, the GS 900 will, via interaction 11, provide information to the coached agent. This may involve presenting various icons or award level information to the agent, reflecting their relative standing with other agents. This information can be presented to the agent's workstation or to the leaderboard, depending on the game format involved. Because the GS receives information associated with a variety of agents, it can maintain a relative standing of the agents associated with a common coaching campaign and maintain a ranking. The GS may also, via interaction 12, control the display of a leaderboard 905, by displaying agent ranking information.

One such example of a leaderboard display is shown in FIG. 10. This shows the leaderboard 1000 displaying leading agents associated with a contest. In this type of format, all agents in the coaching campaign may be ranked as to their point standing, and in this example, Betty Boop 1005 is indicated as having the lead with 455 point. Further, a badge 1010 is displayed emphasizing the agent's standing. Thus, all agents in the call center could view the leaderboard, and recognize the performance of the identified agents, which may motivate the agents to perform better. The display of the badge 1010 may take various forms, and the GS 900 may also display such badges as widgets on the agent's screen. The presence of a badge can motivate the agent to perform better, as can the display of the information to the group as a whole.

Point Management

"Point management" refers to how points are determined, communicated and used in an incentivization format. It is possible to incorporate the concepts and technologies herein without using points. For example, an agent could be presented with an operational word cloud that is updated in real-time and thus informed as to what operational phrases have been detected. The trend analysis graph could be developed and displayed to the agent that counts the number of positive phrases detected, without allocating points to each phrase. It should be evident that there is some functional similarity in counting operational phrases detected and allocating a single point to each phrase and maintaining a tally. However, the allocation of points facilitates maintaining scores and other gamification applications, and as such provides additional flexibility for various formats for additional agent motivation.

Figure 11:
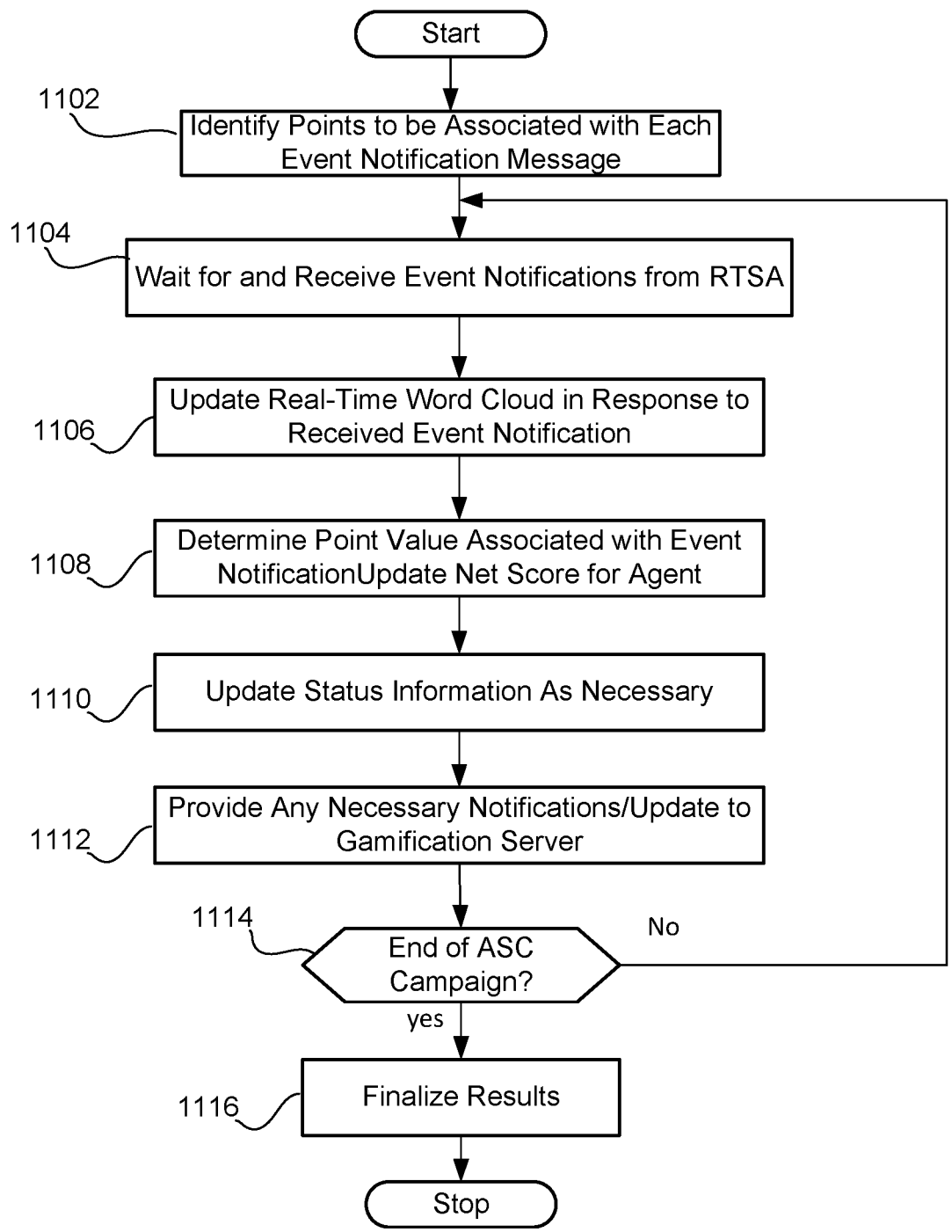
FIG. 11 shows one embodiment of a process flow for processing event notification messages.

The process of point management is illustrated in FIG. 11, in a concise manner, though many of the concepts have been already disclosed. The process begins with operation 1102 where the administrator will define a point level associated with each operational phrase, as disclosed previously. Next, during execution of the coaching campaign, the ASCS will receive event notification messages from the RTSA, which will indicate what operational phrase was detected on the speech from an identified agent. The RTSA system typically does not know any point value associated with an operational phrase.

The ASCS upon receiving the event notification message may then update the word cloud(s) for the identified agent in operation 1106. If points are assigned with the detected phrase, the ASCS will ascertain the point value for the phrase, and process it accordingly in operation 1108. Not all coaching campaigns may necessarily involve a gamification format, and hence there may not be a GS to send the point information. In many embodiments, the ASCS may simply keep a running tally of the accumulated number of notifications received for each operational phrase. This essentially defaults to a single point per phrase. That is assigning a point to every reported instance a phrase and maintaining a total is equivalent in some respects to tallying the number of reported instances, without using points. In either case, the ASCS may tally the instances and maintain the information for a period of time. This may be maintained on a coaching session basis, a shift basis, weekly basis, coaching campaign, or even a per-call or per hour basis (or all of the above). This updating occurs in operation 1110, and may be viewed if the agent or administrator views a trend analysis or other status information.

If points are assigned to each reported operational phrase (which provides more flexibility as it provides weighting to distinguish various phrases), the points may be provided to a gamification server in operation 1112. The information reported to the gamification server would be point information, not a message count. Further information would be provided indicating which agent the information is associated with. The gamification server typically is not aware of which particular operational phrases were reported to the ASCS nor of the assigned point value, and the ASCS maps the message to a point value, and hence this allows the gamification server to be unaware of which particular operational phrase was received. The gamification server is configured to apply a particular incentivization format when processing the points, and typically there are various such predefined formats which can be applied. In other embodiments, the ASCS could inform the GS of the operational phrase detected, and the GS could assign a point value.

Finally, once the agent speech coaching campaign is completed in operation 1114, the results can be finalized in operation 1116. If not, then further event notifications may be received at operation 1114. The finalizing of the results in operation 1116 may involve generating final statistics, contest results and standing, reports, etc. At this point, the administrator can review the impact on the KPIs for the agents being coached, and can evaluate whether the coaching campaign was effective with respect to each agent.

Various Embodiments

In light of the above explanation, there are a number of variations on the above process that are possible, and which can be better appreciated now that the overall operation has been explained. Turning to FIG. 2, these are described in conjunction with each of the operations shown.

Focusing on the data gathering phase first, the purpose of monitoring agents in operation 202 is to identify agents to emulate or to not emulate in operation 204. The administrator may skip this step and simply manually identify an agent (or multiple agents) for purposes of generating word clouds. As noted earlier, if only a desirable phrase word cloud is to be used, then only top performing agents may be identified. It is not necessary to have a measured KPIs defined in order to identify top performing agents. This could be done heuristically by the administrator.

The purpose of retrieving the call recordings of the identified agents is to generate word clouds which are to be used in coaching an agent. It is possible for the administrator to simply define a list of words heuristically, without the system deriving a word cloud, and then having the administrator edit it in operation 210. This word cloud can be retained long after the agents whose call recording were used to create it, have left the contact center. Thus, a word cloud derived from an excellent performing agent could be retained and used long after that agent is now longer employed by the contact center. Further, it is possible to define a library of word clouds (which may have been derived by a third party) which are used in coaching agents.

The configuring phase, comprising operations 212 and 214 of FIG. 2, may also involve configuring a gamification server, as discussed previously. As noted, the gamification server and associated operation is optional. Hence, if not needed, it is not configured. If configured, this could occur in conjunction with the steps of the configuring phase.

The execution phase, comprising operations 216, 218, and 220 has a number of variations that are possible. As noted earlier, one or more agents may be involved in a coaching campaign. If the optional gamification process is configured, then this may require multiple agents to be coached. A number of the formats, such as a contest or a duel, inherently involve more than one agent. Other gamification formats, such as an agent competing with themselves, may operate with only one agent.

During execution, the agent may or may not be able to view a word cloud that is updated on a per-call basis. The agent may be limited to only seeing only trend-analysis information or cumulative statistics. Or, the agent may be limited to only viewing per-call related information. Agents typically are limited in that they can only view their own performance information, whereas administrators can view all the agents' information. In some embodiments, agents may have limited visibility into other agent's performance. For example, if there is a gamification format involved, some of the agents' information may be publically displayed (e.g., current score information in a contest format).

The examples presented herein are described in the context of real-time speech analytics. This allows, e.g., a word cloud to be updated in real time and displayed to the agent and/or administrator. However, the concepts and technologies can be applied to non-real time speech analytics during the execution phase. For example, call recordings can be processed shortly after each call to provide updated status information to the agent for trend analysis and score information, but in non-real time. While real-time word clouds cannot be presented to the agent when call recordings are processed after the call, word clouds can be generated shortly after the call for subsequent review by the agent. This would allow, for example, the agent to review word clouds for calls made on a prior day, or potentially after the call has been completed and prior to accepting the next call. If calls are processed non-real time, then the reporting of point information to a gamification server would also be in non-real time, but in many instances updating a leaderboard on a non-real-time basis (e.g., daily basis) may be acceptable. For example, if the leaderboard displays current contest standings, where the contest extends over several weeks, then updating each agent's relative standing each morning may be acceptable.

Exemplary Processing Device Architecture

Figure 12:
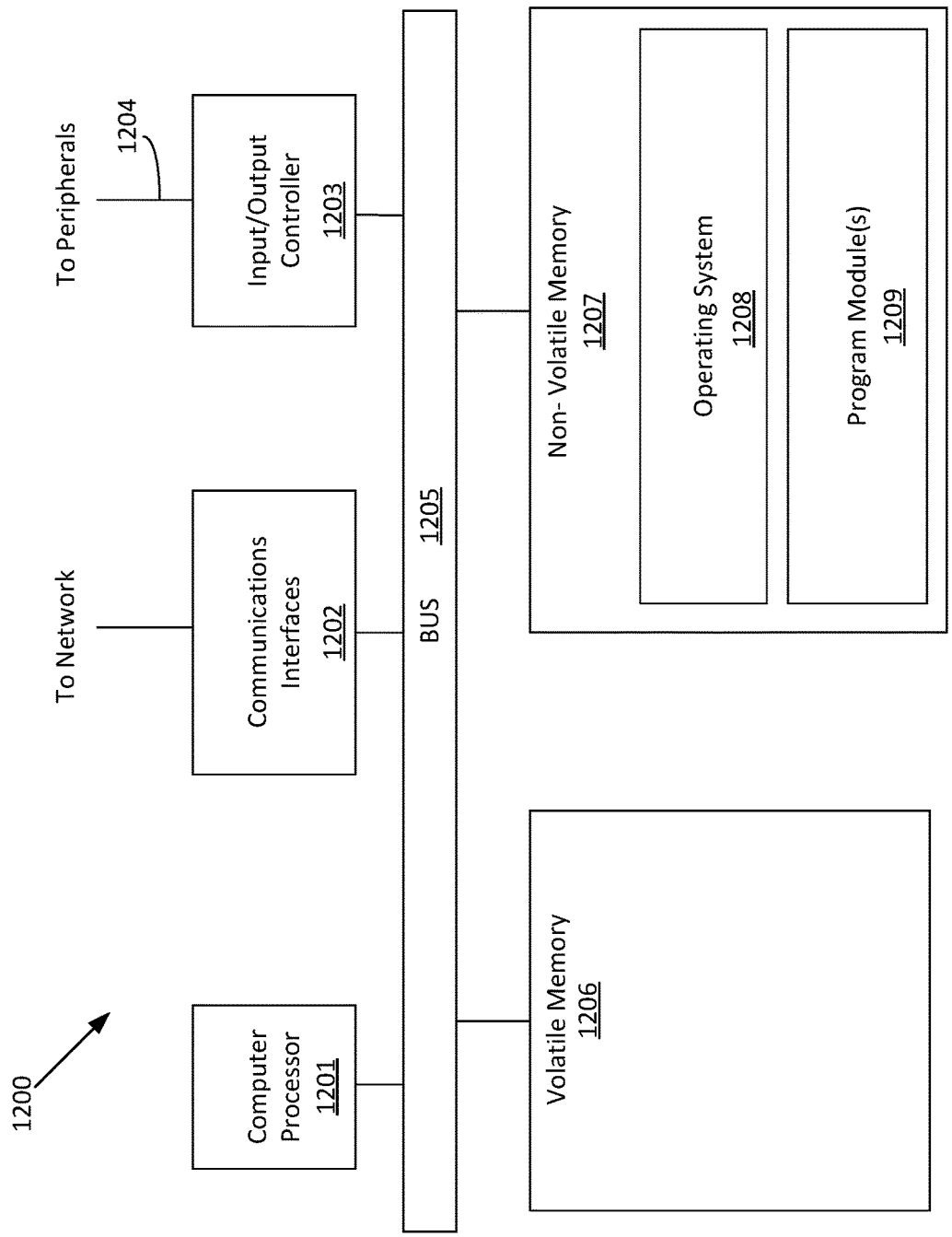
FIG. 12 discloses one embodiment of an architecture of a computer processing component in a contact center for practicing the concepts and technologies disclosed herein.

As discussed in conjunction with FIGS. 1, 3, and 9, the contact center architecture 100 may comprise various components. Accordingly, FIG. 12 is an exemplary schematic diagram of a computer processing component 1200 that may be used in various embodiments of the contact center architecture 100 to practice the technologies disclosed herein such as, for example, the communications handler 131 or the ASCS 155 or gamification server 900. In general, the term "computer processing component" may be exemplified by, for example, but without limitation: a various types of computers, servers, blades, gateways, switches, and the like, as well as any combination of devices or entities adapted to perform the functions described herein.

As shown in FIG. 12, the computer processing component 1200 may include one or more computer processors 1201 that may communicate with other elements within the computer processing component 1200 via a bus 1205. The computer processor 1201 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the computer processing component 1200 may also include one or more communication interfaces 1202 for communicating data via the local network with various external devices, such as other components of FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The computer processing component 1200 may further include an input/output controller 1203 that may communicate with one or more input devices or peripherals using an interface 1204, such as, but not limited to: a keyboard, a mouse, a touch screen/display input, microphone, pointing device, etc. The input/output controller 1203 may also communicate with output devices or peripherals, such as displays, printers, speakers, headsets, banner displays, etc.

The computer processor 1201 may be configured to execute instructions stored in volatile memory 1206, non-volatile memory 1207, or other forms of computer-readable storage media accessible to the processor 1201. The volatile memory 1206 may comprise various types of memory technologies, including, but not limited to: random access memory ("RAM"), dynamic random access memory ("DRAM"), static random access memory ("SRAM"), and other forms well known to those skilled in the art. The non-volatile memory 1207 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1207 may store program code and data, which also may be loaded into the volatile memory 1206 at execution time. Specifically, the non-volatile memory 1207 may store one or more program modules 1209, containing instructions for performing the processes and/or functions associated with the technologies disclosed herein, and/or operating system code 1208. In addition, these program modules 1209 may also access, generate, or store data 1210, in the non-volatile memory 1207, as well as in the volatile memory 1206. The volatile memory 1206 and/or non-volatile memory 1207 may be used to store other information including, but not limited to: records, applications, programs, scripts, source code, object code, byte code, compiled code, interpreted code, machine code, executable instructions, or the like. These may be executed or processed by, for example, the processor 1201 and/or may form a part of, or may interact with, the program modules 1209.

The technologies described herein may be implemented in various ways, including as computer program products comprising memory storing instructions causing a computer processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system for providing speech coaching to an agent comprising a first processor configured to:
   receive an event notification message from a real-time speech analytics ("RTSA") system indicating an operational word phrase detected in speech of the agent during a call, the event notification message further identifying the agent, and wherein the operational word phrase is one word phrase in a set of desirable operational word phrases;
   cause a word cloud consisting of the set of desirable operational word phrases to be displayed during the call on a computer used by the agent;
   modify a visual characteristic of the operational word phrase in the word cloud stored in memory associated with the agent in response to receiving the event notification message, wherein the word cloud comprises the set of desirable operational word phrases, wherein the visual characteristic indicates detection of the operational word phrase in the speech of the agent during the call; and
   cause the word cloud with the modified visual characteristic of the operational word phrase to be displayed during the call on the computer used by the agent, wherein the operational word phrase depicted in the word cloud is presented in a visually distinct manner from another operational word phrase depicted in the word cloud based on the visual characteristic, wherein the another operational word phrase has not been detected by the RTSA system during the call, and wherein the another operational word phrase is part of the set of desirable operational word phrases; and present a graph on the computer used by the agent comprising a plurality of first numerical values over a time period, the plurality of first numerical values reflecting detection by the RTSA system of operational word phrases from the set of desirable operational word phrases, wherein the graph further comprises a plurality of second numerical values over the time period, the plurality of second numerical values reflecting values of a key performance indicator associated with performance of the agent.

2. The system of claim 1, wherein the first processor is further configured to:

cause a point value to be determined based on the operational word phrase indicated by the event notification message;

increment a counter associated with the agent by the point value; and cause a third numerical value indicated by the counter to be displayed to the agent on the computer used by the agent during the call.

3. The system of claim 1 wherein the first processor is further configured to:

retrieve a plurality of call recordings involving a plurality of agents;

process the plurality of call recordings to generate a preliminary word cloud; and receive inputs from a user removing one or more operational word phrases in the set of desirable operational word phrases in the preliminary word cloud thereby generating the word cloud.

4. The system of claim 3, wherein the first processor is further configured to:

identify the plurality of agents using the key performance indicator.

5. The system of claim 2, wherein the first processor is further configured to:

transmit the third numerical value to a second processor, wherein the second processor is configured to:

cause the third numerical value to be displayed on a leaderboard along with a name of the agent; and cause a fourth numerical value to be displayed on the leaderboard along with a second name of a second agent, wherein the real-time speech analytics ("RTSA") system is configured to detect the operational word phrase in speech of the second agent during a second call.

6. The system of claim 5, wherein the first processor is further configured to:

associate the agent with a coaching campaign, and associate the second agent with the coaching campaign, wherein the coaching campaign is further associated with the set of desirable operational word phrases.

7. A non-transitory computer readable media comprising instructions that when executed by a computer processor cause the computer processor to:

receive an event notification message from a real-time speech analytics ("RTSA") system indicating an operational word phrase from a set of desirable operational word phrases detected in speech of an agent during a call, the event notification message further identifying the agent;

cause a word cloud consisting of the set of desirable operational word phrases to be displayed during the call on a computer used by the agent;

modify a visual characteristic of the operational word phrase in the word cloud stored in memory associated with the agent in response to receiving the event notification message, wherein the word cloud indicates the set of desirable operational word phrases, the visual characteristic indicating detection of the operational word phrase in the speech of the agent during the call; and cause the word cloud with the modified visual characteristic of the operational word phrase to be displayed during the call on the computer used by the agent, wherein the operational word phrase depicted in the word cloud is presented in a visually distinct manner based on the visual characteristic from another operational word phrase depicted in the word cloud, wherein the another operational word phrase has not been detected by the RTSA system during the call, and wherein the another operational word phrase is part of the set of desirable operational word phrases; and present a graph on the computer used by the agent comprising a plurality of first numerical values over a time period, the plurality of first numerical values reflecting detection by the RTSA system of operational word phrases from the set of desirable operational word phrases, wherein the graph further comprises a plurality of second numerical values over the time period, the plurality of second numerical values defined by a key performance indicator associated with performance of the agent.

8. The non-transitory computer readable media of claim 7, wherein the instructions further cause the computer processor to:

cause a point value to be determined based on the operational word phrase indicated by the event notification message;

increment a counter associated with the agent by the point value; and cause a third numerical value indicated by the counter to be displayed to the agent on the computer used by the agent during the call.

9. The non-transitory computer readable media of claim 7, wherein the instructions further cause the computer processor to:

retrieve a plurality of call recordings involving a plurality of agents;

process the plurality of call recordings to generate a preliminary word cloud;

receive inputs from a user removing one or more operational word phrases in the set of desirable operational word phrases in the preliminary word cloud; and removing the one or more operational word phrases from the preliminary word cloud thereby generating the word cloud.

10. The non-transitory computer readable media of claim 9, wherein the instructions further cause the computer processor to:

identify the plurality of agents using the key performance indicator.

11. The non-transitory computer readable media of claim 8, wherein the instructions further cause the computer processor to:

transmit the third numerical value to a second processor, wherein the second processor is configured to:

cause the third numerical value to be displayed on a leaderboard along with a name of the agent; and cause a fourth numerical value to be displayed on the leaderboard along with a second name of a second agent, wherein the real-time speech analytics ("RTSA") system indicates detection of the operational word phrase in speech of the second agent during a second call.

12. The non-transitory computer readable media of claim 11, wherein the instructions further cause the computer processor to:
associate the agent with a coaching campaign, and
associate the second agent with the coaching campaign, wherein the coaching campaign is further associated with the desirable operational word phrases.

13. A method for providing speech coaching to an agent, comprising:
identifying a plurality of agents using a key performance indicator;
retrieving a plurality of call recordings involving the plurality of agents;
processing the plurality of call recordings by a speech analytics system to produce a word cloud;
editing the word cloud by a contact center administrator to produce a desirable operational word cloud comprising a desirable operational word phrase;
configuring the speech analytics system to detect the desirable operational word phrase in the desirable operational word cloud;
receiving a message at a computer processor system from the speech analytics system indicating detection of the desirable operational word phrase in a call of the agent;
displaying the desirable operational word cloud to the agent during the call, whereby at least one other desirable operational word phrase is displayed with a visual characteristic indicating the at least one other desirable operational word phrase was not detected by the speech analytics system during the call;
incrementing a counter stored in memory of the computer processor system reflecting a tally of the desirable operational word phrase detected during the call of the agent; and
presenting, to the agent on a computer display during the call, a numerical value based on the tally of the desirable operational word phrase detected during the call; and
presenting to the agent on the computer display during the call, a plurality of numerical values reflecting detection of a plurality of desirable operational word phrases detected during a time period; and
presenting to the agent on the computer display during the during the call a plurality of second numerical values corresponding to the key performance indicator associated with the agent during the time period.

14. The method of claim 13, further comprising:
displaying the desirable operational word cloud to the agent during the call, whereby the desirable operational word phrase is displayed with a second visual characteristic indicating the desirable operational word phrase was detected by the speech analytics system during the call.

15. The method of claim 13, wherein the plurality of numerical values and the plurality of second numerical values are displayed on a graph associated with the time period.

16. The method of claim 13, wherein incrementing the counter stored in memory reflecting the tally of the desirable operational word phrase detected during the call of the agent comprises:
determining a point value associated with the desirable operational word phrase; and
adding the point value to a prior tally value to produce the tally of the desirable operational word phrase detected.

* * * * *